US010386932B2

(12) United States Patent
Kang

(10) Patent No.: US 10,386,932 B2
(45) Date of Patent: Aug. 20, 2019

(54) DISPLAY APPARATUS AND CONTROL METHOD THEREOF

(71) Applicant: SAMSUNG ELECTRONICS CO., LTD., Suwon-si (KR)

(72) Inventor: Ho-woong Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 15/209,326

(22) Filed: Jul. 13, 2016

(65) Prior Publication Data

US 2017/0017304 A1 Jan. 19, 2017

(30) Foreign Application Priority Data

Jul. 16, 2015 (KR) .................. 10-2015-0101117

(51) Int. Cl.
| | |
|---|---|
| *G06F 3/01* | (2006.01) |
| *G06F 3/02* | (2006.01) |
| *G06F 3/0346* | (2013.01) |
| *G06F 3/0484* | (2013.01) |
| *H04N 21/422* | (2011.01) |
| *H04N 21/437* | (2011.01) |
| *H04N 21/431* | (2011.01) |
| *H04N 21/4223* | (2011.01) |

(52) U.S. Cl.
CPC ............. *G06F 3/017* (2013.01); *G06F 3/02* (2013.01); *G06F 3/0346* (2013.01); *G06F 3/0484* (2013.01); *H04N 21/4223* (2013.01); *H04N 21/42203* (2013.01); *H04N 21/42222* (2013.01); *H04N 21/42224* (2013.01); *H04N 21/4312* (2013.01)

(58) Field of Classification Search
CPC ...... G06F 3/017; G06F 3/0346; G06F 3/0484; G06F 3/02; H04N 21/42222; H04N 21/4312; H04N 21/42203; H04N 21/42224; H04N 21/4223
See application file for complete search history.

(56) References Cited

U.S. PATENT DOCUMENTS

| | | | |
|---|---|---|---|
| 2008/0303794 A1 | 12/2008 | Bolt et al. | |
| 2014/0267019 A1* | 9/2014 | Kuzmin ............ | G06K 9/00355 345/156 |

(Continued)

*Primary Examiner* — Vinh T Lam
(74) *Attorney, Agent, or Firm* — Sughrue Mion, PLLC

(57) ABSTRACT

A display apparatus includes a display configured to display an image; a communicator configured to communicate with an input apparatus, the input apparatus including at least one sensor that senses a user's gesture input; and at least one processor configured to, in response to the gesture input being sensed by the sensor of the input apparatus, determine a command which corresponds to the sensed gesture input among a plurality of commands corresponding to a plurality of functions supported by the display apparatus, and implement an operation corresponding to the determined command, and wherein the command corresponding to the gesture input is based on at least one among content and a first user interface displayed on the display, or a user's input prior to the gesture input. Thus, the display apparatus implements operations in response to a user's gesture input, thereby providing more familiar and closer interaction with a user.

18 Claims, 24 Drawing Sheets

(56) References Cited

U.S. PATENT DOCUMENTS

| | | | |
|---|---|---|---|
| 2015/0091811 A1* | 4/2015 | Hombert | H04M 1/67 345/173 |
| 2015/0123903 A1* | 5/2015 | Bang | G06F 3/0317 345/158 |
| 2015/0148106 A1* | 5/2015 | Choi | H04W 52/027 455/566 |
| 2015/0227253 A1* | 8/2015 | Williams | G06F 3/0416 345/173 |
| 2016/0006864 A1* | 1/2016 | Park | H04N 21/4126 715/835 |
| 2016/0092504 A1* | 3/2016 | Mitri | G06F 16/245 707/737 |
| 2016/0139691 A1* | 5/2016 | Li | G06F 3/03545 345/179 |
| 2016/0202872 A1* | 7/2016 | Jang | G06F 3/0346 715/728 |
| 2016/0239182 A1* | 8/2016 | Eronen | G06F 3/14 |
| 2016/0239201 A1* | 8/2016 | Wang | G06F 3/04883 |
| 2016/0373804 A1* | 12/2016 | Iyer | G06F 3/0488 |
| 2017/0154625 A1* | 6/2017 | Heo | H04N 21/4227 |
| 2017/0155946 A1* | 6/2017 | Coenen | H04N 21/42224 |
| 2017/0357412 A1* | 12/2017 | Shiode | G06F 16/242 |

* cited by examiner

FIG. 4
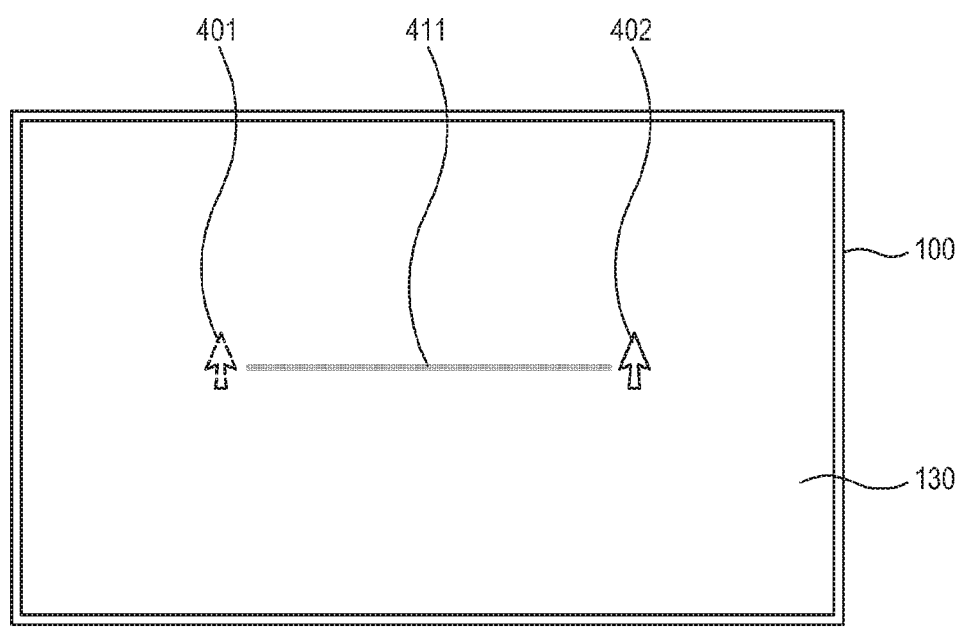
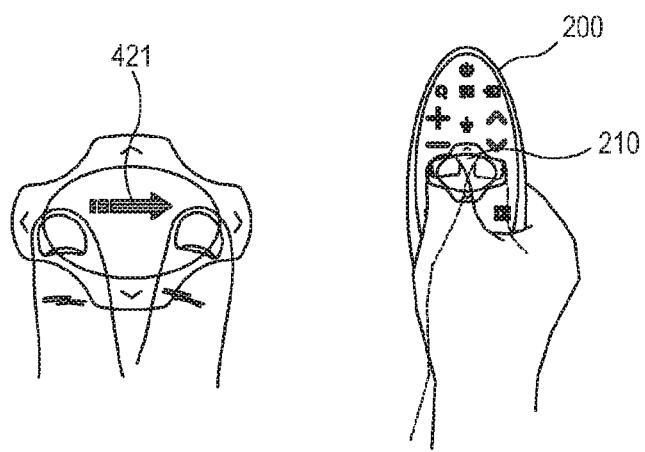

FIG. 5
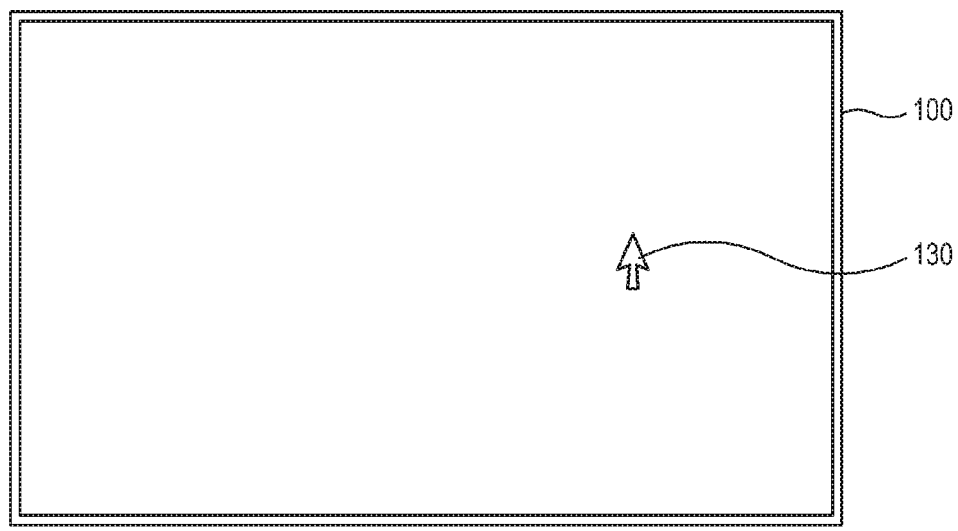
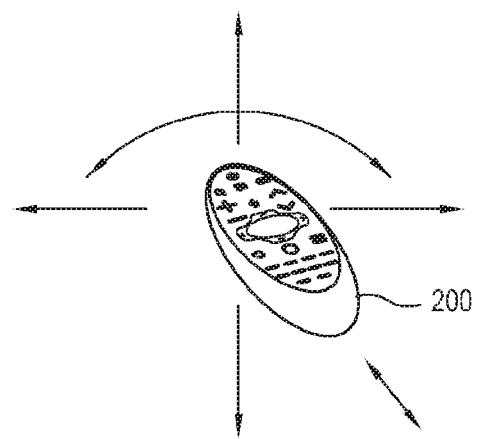

FIG. 7
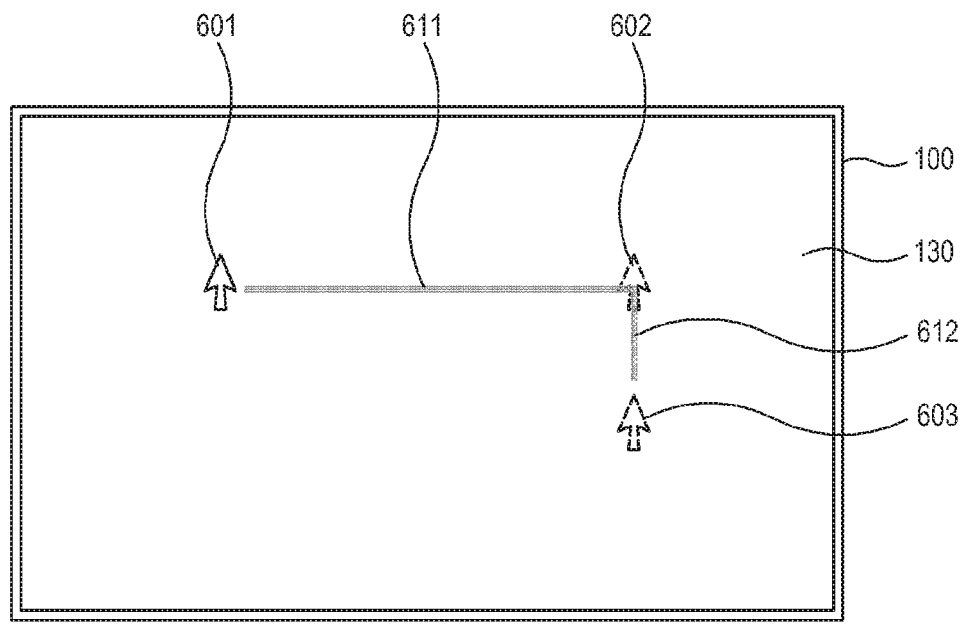
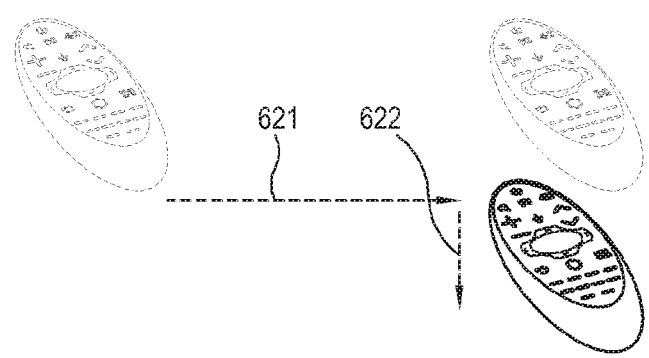

FIG. 13
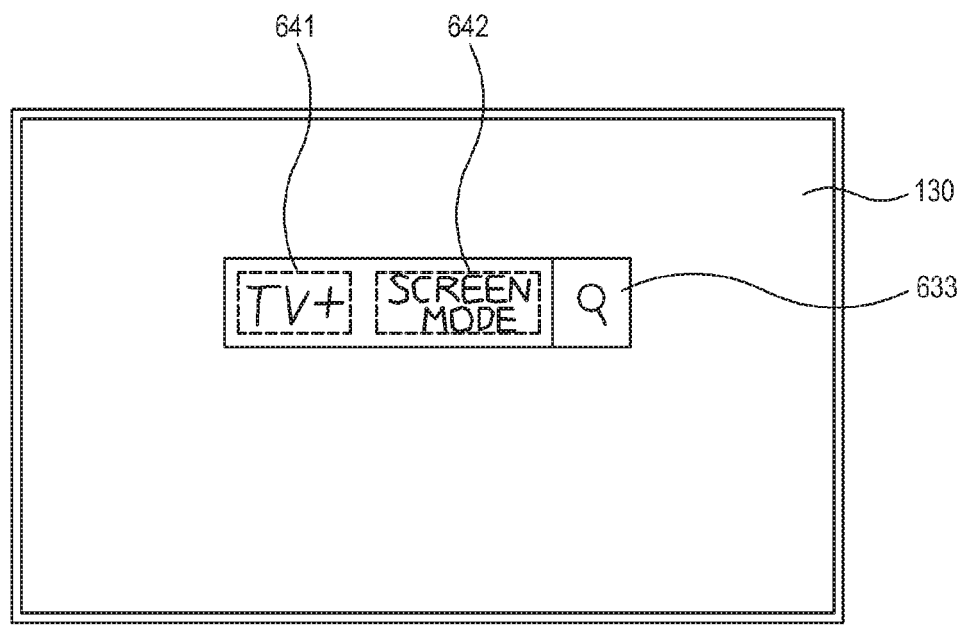
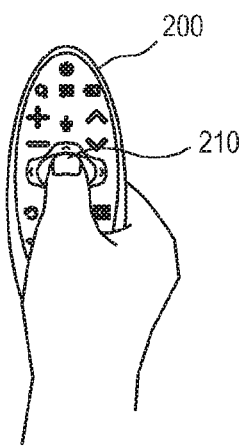

FIG. 21
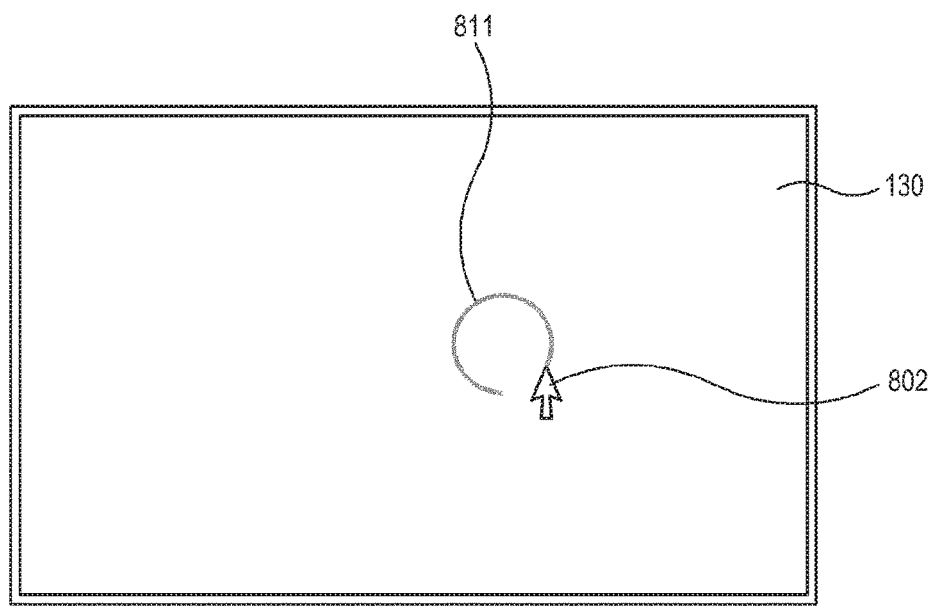
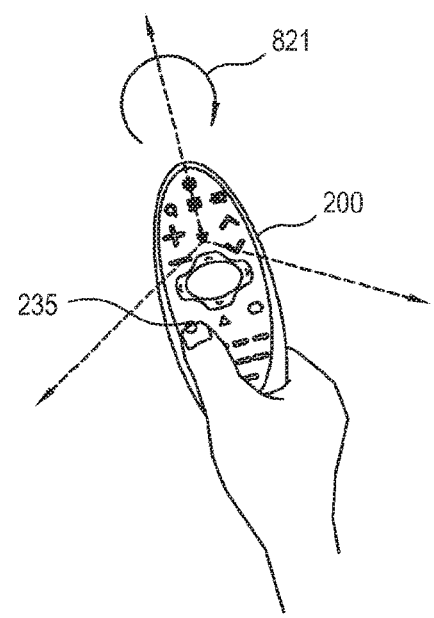

DISPLAY APPARATUS AND CONTROL METHOD THEREOF

CROSS-REFERENCE TO RELATED APPLICATION

This application claims priority from Korean Patent Application No. 10-2015-0101117, filed on Jul. 16, 2015 in the Korean Intellectual Property Office, the disclosure of which is incorporated herein by reference in its entirety.

BACKGROUND

Field

Apparatuses and methods consistent with the exemplary embodiments relate to a display apparatus and a control method thereof, and more particularly to a display apparatus that can receive a gesture input through an input apparatus, and a control method thereof.

Description of the Related Art

A display system refers to a system which can display an image based on an image signal received from the exterior or generated by itself, and includes a display apparatus having a display panel for displaying an image and a plurality of peripheral apparatuses classified corresponding to their functions.

The display system may be implemented by a combination of various apparatuses in accordance with desired functions. For example, the display system may include a display apparatus such as a smart television (TV), and an input apparatus such as a remote controller for issuing various commands to the display apparatus.

Typically, the input apparatus includes various buttons corresponding to a numeral key, a menu key, a direction key and the like to receive a user's input. Further, the input apparatus may include a touch sensor for sensing a user's touch input, and a motion sensor for sensing its own motion, etc.

The display apparatus displays a pointing cursor on a screen at a position corresponding to a user's input. A user activates a desired item by navigating menu items while controlling the direction keys provided in the input apparatus or moving a cursor through a touch sensor or motion sensor, and selects the activated item, thereby issuing his/her command.

In such a manner of navigating the menu items, a user mostly has to go through many steps before issuing a desired command, and it is difficult for a user to intuitively know an input state or instantly get feedback on an input result.

To keep up with a trend toward a human interface emphasizing cohesiveness with a user, natural communication between an apparatus and a user, i.e., interaction, has been in increasing demand.

SUMMARY

According to an aspect of an exemplary embodiment, there is provided a display apparatus including: a display configured to display an image; a communicator configured to communicate with an input apparatus, the input apparatus including at least one sensor for sensing a gesture input of a user; and at least one processor configured to: in response to the gesture input being sensed, determine a command that corresponds to the sensed gesture input from among a plurality of commands, the plurality of commands corresponding to a plurality of functions supported by the display apparatus; and implement an operation corresponding to the determined command, wherein the command that corresponds to the gesture input is based on at least one among a content and a first user interface displayed on the display, or is based on a user's input prior to the gesture input. Thus, the display apparatus implements operations in response to a user's gesture input, thereby improving convenience in interaction between the display apparatus and a user.

The processor may be configured to control the display to display a second user interface corresponding to the determined command. Thus, feedback on the user interface is provided as a result of the gesture input.

At least one among the first user interface and the second user interface may include a drawing object corresponding to a moving path of the gesture input. Thus, a user can instantly check the result of the gesture input.

The drawing object may include a search box for one among an internal search and an external search, wherein the internal search may be for searching for at least one among a function supported by the display apparatus, stored content, and a selectable channel, and the external search may be for searching on Internet or for a connectable external apparatus. Thus, a user can easily get desired information without any complicated process of reading a manual thoroughly.

The processor may be further configured to implement one among the internal search and the external search, based on at least one among a shape and color of the drawing object, and a user's previous input. Thus, it is possible to limit a search range, and thus a user can selectively get only desired information while reducing a load of the apparatus.

The gesture input may include a prefix that is input to the search box, and the processor may be configured to implement an internal search or an external search in accordance with the input prefix, and control the display to display a search result. Thus, it is easily to search desired information through a prefix.

The processor may be further configured to control the display to display a list corresponding to the search result. Thus, a user can instantly check the search result.

The processor may be further configured to control the display to display a drawing object corresponding to a moving path of the gesture input. Thus, the result of the gesture input is intuitively reflected on the screen, thereby improving interaction with a user through communion between a user and the input apparatus.

The drawing object may include at least one among a figure, a letter, a numeral, and at least one among straight lines and curved lines having directivity. Thus, there are no limits to the gesture input, and a user's various inputs are allowed.

The input apparatus may include a plurality of buttons, the user's previous input may include a user's selection with regard to one among the plurality of buttons, and the processor may be further configured to determine the button selected by a user, and control the display to display a drawing object corresponding to the determined button. Thus, it is possible to input various commands with the restricted input means.

The display apparatus may further include a memory configured to store a table with the commands corresponding to the gesture inputs, and the commands corresponding to the gesture inputs are set by a user. Thus, a user can get various use experiences, and thus utilize his/her inputs by personally optimized methods.

The sensor may include at least one among a touch sensor and a motion sensor. Thus, it is possible to make a desired input through the apparatus with at least one means supporting the gesture input.

According to an aspect of another exemplary embodiment, there is provided a method of controlling a display apparatus, the method including: receiving a gesture input from an input apparatus, the input apparatus including at least one sensor for sensing a gesture input of a user; determining a command that corresponds to the sensed gesture input from among a plurality of commands, the plurality of commands corresponding to a plurality of functions supported by the display apparatus; and implementing an operation corresponding to the determined command, wherein the command that corresponds to the gesture input is based on at least one among a content and a first user interface displayed on a display, or is based on a user's input prior to the gesture input. Thus, the display apparatus implements operations in response to a user's gesture input, thereby improving convenience in interaction between the display apparatus and a user.

The method may further include displaying a second user interface corresponding to the determined command. Thus, feedback on the user interface is provided as a result of the gesture input.

At least one among the first user interface and the second user interface may include a drawing object corresponding to a moving path of the gesture input. Thus, a user can instantly check the result of the gesture input.

The drawing object may include a search box for one among an internal search and an external search, wherein the internal search may be for searching for at least one among a function supported by the display apparatus, stored content, and a selectable channel, and the external search may be for searching on Internet or for a connectable external apparatus. Thus, a user can easily get desired information without any complicated process of reading a manual thoroughly.

The implementing the operation may include implementing one among the internal search and the external search, based on at least one among a shape and color of the drawing object and a user's previous input. Thus, it is possible to limit a search range, and thus a user can selectively get only desired information while reducing a load of the apparatus.

The gesture input may include a prefix that is input to the search box, and the implementing the operation may include implementing an internal search or an external search in accordance with the input prefix, and displaying a search result. Thus, it is easily to search desired information through a prefix.

The method may include displaying a list corresponding to the search result. Thus, a user can instantly check the search result.

The method may include displaying a drawing object corresponding to a moving path of the gesture input. Thus, the result of the gesture input is intuitively reflected on the screen, thereby improving interaction with a user through communion between a user and the input apparatus.

The drawing object may include at least one among a figure, a letter, a numeral, and at least one among straight lines and curved lines having directivity. Thus, there are no limits to the gesture input, and a user's various inputs are allowed.

The input apparatus may include a plurality of buttons, the user's previous input may include a user's selection with regard to one among the plurality of buttons, and the displaying the drawing object may include determining the button selected by a user, and displaying a drawing object corresponding to the determined button. Thus, it is possible to input various commands with the restricted input means.

The method may include setting or modifying the commands corresponding to the gesture inputs. Thus, a user can get various use experiences, and thus utilize his/her inputs by personally optimized methods.

The receiving the gesture input may include receiving the gesture input from at least one among a touch sensor and a motion sensor. Thus, it is possible to make a desired input through the apparatus with at least one means supporting the gesture input.

BRIEF DESCRIPTION OF THE DRAWINGS

The above and/or other aspects will become apparent and more readily appreciated from the following description of exemplary embodiments, taken in conjunction with the accompanying drawings, in which:

FIG. 4 to FIG. 6 illustrate an exemplary embodiment in which a user's input is received through the input apparatus of FIG. 3;

FIG. 7 to FIG. 11 illustrate an exemplary embodiment in which a search box is generated and displayed in response to a gesture input;

FIG. 12 to FIG. 17 illustrate an exemplary embodiment in which a prefix is input to the search box;

FIG. 21 illustrates an exemplary embodiment in which the gesture input is received through a hotkey of the input apparatus;

DETAILED DESCRIPTION OF EXEMPLARY EMBODIMENTS

Below, exemplary embodiments will be described with reference to accompanying drawings to such an extent as to be easily realized by a person having an ordinary knowledge in the art. The present disclosure is not limited to the exemplary embodiments set forth herein, and may be materialized variously. For clarity, elements not directly related to the elements of an exemplary embodiment may be omitted, and like numerals refer to like elements throughout. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
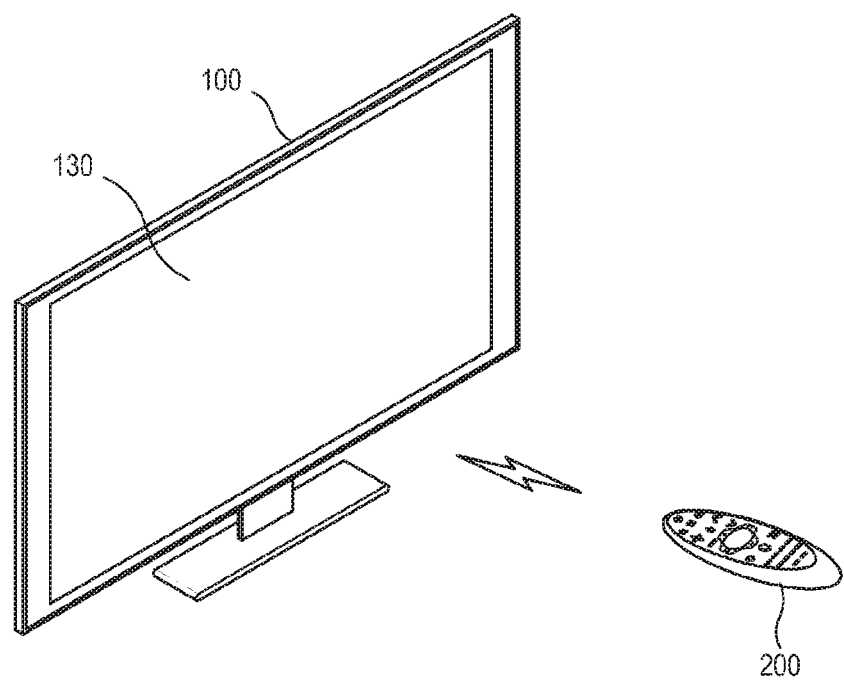
FIG. 1 illustrates a display system according to an exemplary embodiment.

FIG. 1 illustrates a display system 1 according to an exemplary embodiment;

As shown in FIG. 1, the display system 1 according to an exemplary embodiment includes a display apparatus 100 which displays an image based on a image signal processed in accordance with preset processes, and an input apparatus 200 which generates a preset command/data/information/signal for remotely controlling a display apparatus 100 and transmits it to the display apparatus 100.

According to an exemplary embodiment, a display system 1 in which the display apparatus 100 is a television (TV) to display a broadcast image based on a broadcast signal/broadcast information/broadcast data received from a transmitter of a broadcasting station, and the input apparatus 200 is a remote controller. However, the kind of images displayable on the display apparatus 100 is not limited to the broadcast image, for example the display apparatus 100 may display a moving image, a still image and an application, an on screen display (OSD), a user interface (UI, hereinafter referred to as a graphic user interface (GUI)) for controlling various operations, and the like based on signal/data received from various image sources.

According to an exemplary embodiment, the display apparatus 100 may be achieved by a broadcast receiving apparatus capable of processing a broadcast signal/broadcast information/broadcast data received through a terrestrial wave, a cable, a communication satellite, etc.

However, the kind of image signal to be processed in the display apparatus 100 is not limited to the satellite broadcast signal. For example, the display apparatus 100 may receive a signal from various external apparatuses, e.g., a smart phone, a smart pad such as a tablet computer, a mobile apparatus including an MP3 player, a PC such as a desktop computer or a laptop computer, etc. Further, the display apparatus 100 may process a signal so that the display apparatus 100 such as the television can display a moving image, a still image, an application, an on-screen display (OSD), a user interface (UI or also called a graphic user interface (GUI)) for controlling various operations, etc. based on signal/data stored in an internal/external storage medium.

Further, the image source according to an exemplary embodiment is not limited to the broadcasting station. That is, the image source may include any apparatus or station as long as it can transmit and receive information.

According to an exemplary embodiment, the display apparatus 100 may be achieved by a Smart TV or an Internet Protocol (IP) TV. The Smart TV can receive and display a broadcast signal in real time, and has a web browsing function so that the broadcast signal can be displayed in real time and at the same time various contents can be searched and consumed through Internet. To this end, the Smart TV provides an interface convenient for a user. Further, the Smart TV includes an open software platform in order to provide an interactive service to a user. Therefore, the Smart TV may provide a user with an application that offers various contents, e.g., a predetermined service to a user through the open software platform. Such an application is an application program capable of providing various kinds of service. For example, the application includes applications for social network service (SNS), finance, news, weather, a map, music, movie, a game, an electronic book, etc.

According to an exemplary embodiment, display apparatus 100 is a monitor connected to a computer, and the input apparatus 200 is a peripheral device such as a mouse, a remote controller or the like communicating with the computer.

In addition, the display apparatus 100 according to an exemplary embodiment may be applied to a large format display. For example, the display apparatus 100 may include a video wall using a plurality of display apparatuses, a digital signage), or the like.

The input apparatus 200 is an external apparatus capable of wirelessly communicating with the display apparatus 100, and the wireless communication includes Bluetooth, radio frequency (RF), ZigBee, infrared and the like communications. The input apparatus 200 is operated by a user to thereby transmit a preset command to the display apparatus 100.

According to an exemplary embodiment, the input apparatus 200 includes at least one sensor for sensing a user's gesture input. Specifically, the input apparatus 200 includes at least one of a touch sensor 210 for receiving a user's touch input, and a motion sensor 220 for sensing its own motion made by a user. The input apparatus 200 can sense a user's gesture input through the touch sensor 210 or the motion sensor 220.

The touch sensor 210 includes a touch pad, and the motion sensor 220 includes at least one of position sensors, i.e., a gyro sensor, an angular speed sensor, a geomagnetic sensor, etc. The display apparatus 100 controls an image displayed on the display 130 in response to touch information or motion information received from the input apparatus 200.

Figure 2:
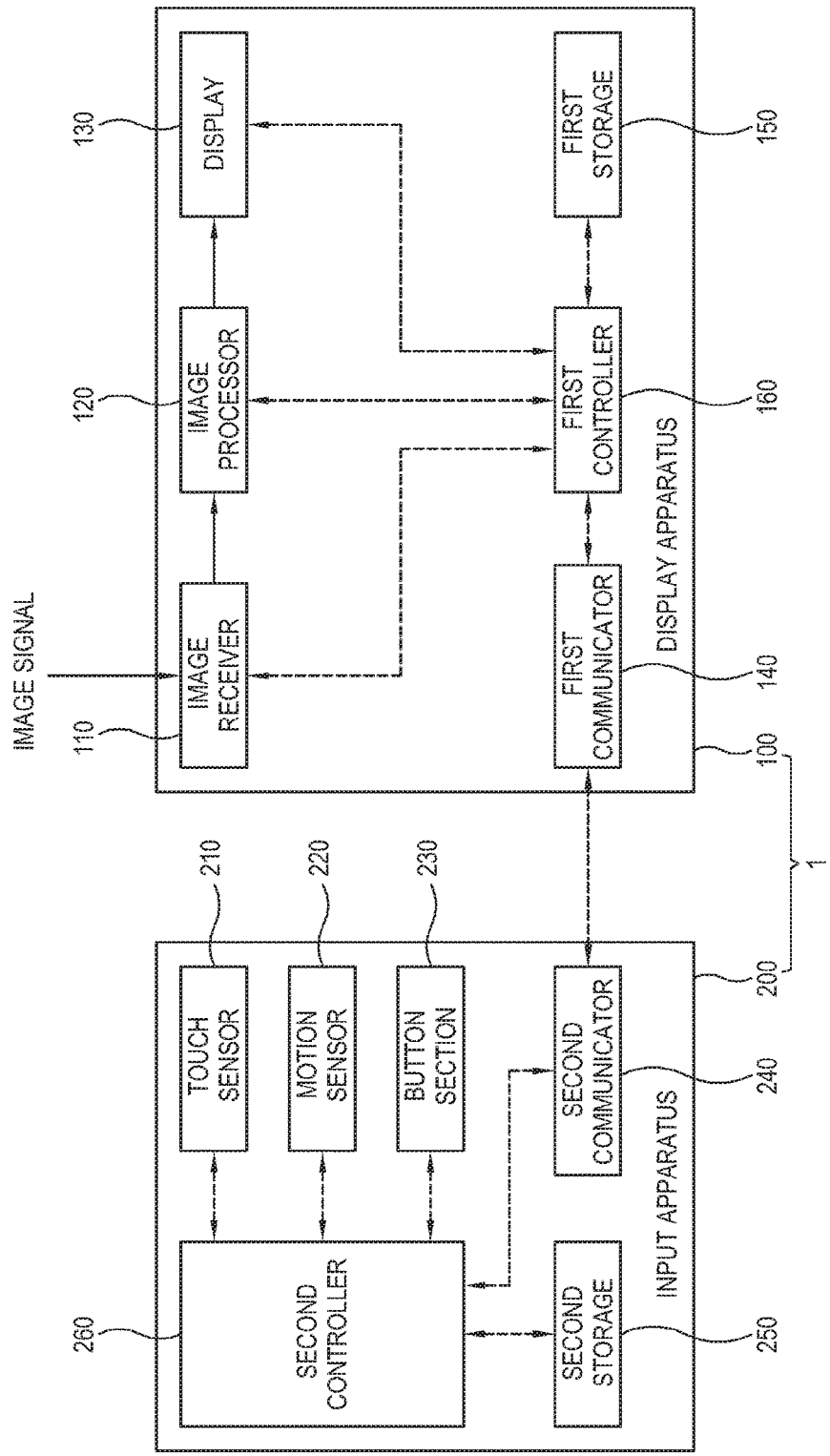
FIG. 2 is a block diagram of a display system according to an exemplary embodiment.

FIG. 2 shows an example that the input apparatus 200 includes both the touch sensor 210 and the motion sensor 220, but not limited thereto. The input apparatus 200 as long as it can sense the gesture input based on a user's touch or the motion of the input apparatus 200. For example, the input apparatus 200 may include another element capable of sensing a user's gesture input in addition to one of the touch sensor 210 and the motion sensor 220.

According to an exemplary embodiment, the input apparatus 200 may include a button section 230 including a plurality of buttons such as numeral keys, menu keys, direction keys for channel/volume control, etc. in addition to the touch sensor 210 or the motion sensor 220.

The display apparatus 100 according to an exemplary embodiment may receive a control command from a user through his/her hand gesture, voice input, etc. as well as the input apparatus 200. To this end, a sensor for sensing the hand gesture, e.g., a camera may be provided in the display apparatus 100, and a voice receiver (or a voice acquirer) for receiving a voice input, e.g., a microphone may be provided in the display apparatus 100 or the peripheral apparatus (e.g., The input apparatus 200).

Exemplary embodiments described below are just examples that may vary depending on the systems, and do not limit the scope of the present disclosure.

Below, the display apparatus 100 and the input apparatus 200 according to an exemplary embodiment will be described with reference to FIG. 2.

FIG. 2 is a block diagram of a display system 1 according to an exemplary embodiment.

As shown in FIG. 2, the display apparatus 100 includes an image receiver 110 to receive a image signal, a image processor 120 to process the image signal received in the image receiver 110, a display 130 to display an image based on the image signal processed by the image processor 120, a first communicator 140 to communicate with an exterior, a first storage 150 (e.g., memory) to store data therein, and a first controller 160 to control the display apparatus 100.

According to an exemplary embodiment, the display apparatus 100 may include a set-top box (STB) or the like image processing apparatus. For example, the set-top box receives and processes a broadcast signal received from an image source through a cable or the like, and outputs it to be displayed on the display apparatus. In this case, the set-top box may include the image receiver and the image processor.

Further, the set-top box receives a user's command from the input apparatus 200, and controls a corresponding image, user interface, etc. to be displayed on the connected display apparatus.

The input apparatus 200 includes the touch sensor 210 to receive a user's touch input; the motion sensor 220 to sense the motion of the input apparatus 200; the button section 230 including various menu keys, numeral keys, direction keys, etc. to be operated by a user; a second communicator 240 to communicate with the exterior; a second storage 250 (e.g., memory) to store data; and a second controller 260 to control the second communicator to send the display apparatus 100 a command corresponding to a user's input using at least one among the touch sensor 210, the motion sensor 220 and the button section 230.

Below, details of the display apparatus 100 will be described.

The image receiver 110 receives an image signal and transmits it to the image processor 120. The image receiver 110 may be variously achieved in accordance with the formats of an image signal and the types of the display apparatus 100. For example, the image receiver 110 may wirelessly receive a radio frequency (RF) signal from a broadcasting station, or may receive an image signal based on composite video, component video, super video, Syndicat des Constructeurs d'Appareils Radiorécepteurs et Téléviseurs (SCART), high definition multimedia interface (HDMI) or the like standards through a wire or a cable. If an image signal is a broadcast signal, the image receiver 110 includes a tuner to be tuned to a channel for receiving a broadcast signal.

Further, the image signal may be received from the external apparatus such as a personal computer (PC), an audio/video (AV) apparatus, a smart phone, a smart pad, etc. In addition, the image signal may be based on data received through Internet or the like network. In this case, the display apparatus 100 may perform network communication through the first communicator 140, or may further include a separate wired or wireless network communicator. The image signal may be based on data stored in a nonvolatile first storage 150 such as a flash memory, a hard disk or the like. The first storage 150 may be internally or externally provided in the display apparatus 100. If the first storage 150 is externally provided, there may be provided a connector to which the storage 160 is connected.

The image processor 120 performs various image processing processes previously set with respect to the image signal. The image processor 120 outputs the processed image signal to the display 130 so that the display 130 can display the image.

There is no limit to the kind of image processing processes performed by the image processor 120. For example, the image processing process may include decoding corresponding to various image formats, de-interlacing, frame refresh rate conversion, scaling, noise reduction for improving picture quality, detail enhancement, line scanning, etc. The image processor 120 may be achieved by an individual group for independently performing each of the processes, or may be achieved by a system-on-chip (SoC) where various functions corresponding to such processes are integrated.

The display 130 displays an image based on the image signal received from the image processor 120. The display 130 may for example be achieved by liquid crystal, plasma, a light emitting diode (LED), an organic light-emitting diode (OLED), a surface-conduction electron-emitter, a carbon nano-tube (CNT), nano-crystal, or the like various displays, without limitation.

The display 130 may include additional elements in accordance with its types. For example, if the display 130 is achieved by the liquid crystal, the display 130 includes a liquid crystal display (LCD) panel, a backlight unit for supplying light to the LCD panel, and a panel driver for driving the panel.

The display 130 displays various user interfaces (UIs) including menu items of the display apparatus 100, and a pointing cursor, i.e., a pointer indicating a position corresponding to a user's input.

According to an exemplary embodiment, the user interface is displayed corresponding to a user's gesture input sensed through the touch sensor 210 or the motion sensor 220 of the input apparatus 200, and includes a drawing object displayed corresponding to a moving path (trajectory or traces) of a gesture input.

The gesture input is given in such a manner of transferring, i.e., moving a pointer displayed on the display 130 through the touch sensor 210 or the motion sensor 220. The drawing object may have various shapes such as a figure, a letter, a numeral, at least one between straight and curved lines having directivity, etc. Further, the drawing object may have various colors, and the color of the drawing object may be selected by a user through the button section 230 provided in the input apparatus 200.

For example, a user may make a gesture input in a way of drawing a figure, a letter, a numeral or the like on the display 130 with a pointer. A user can easily make a gesture input while viewing the drawing object, i.e., the user interface marked along the drawing path. In other words, the gesture input according to an exemplary embodiment provides communion, i.e., interaction between a user and the user interface displayed on the display apparatus 100.

According to an exemplary embodiment, the gesture input received in the display apparatus 100 includes a hand gesture. For example, a user may make an input in a manner of moving a pointer displayed on the display 130 with a finger or the like, and the display 130 may display a drawing object corresponding to the moving path of the pointer based on the hand gesture. The gesture input according to this exemplary embodiment may include drawing two or more straight or curved lines on the display 130 by a user with a plurality of fingers.

Further, the display 130 according to an exemplary embodiment may be achieved by a touch screen. In this case, the gesture input received in the display apparatus 100 includes a touch input to the touch screen.

The touch screen may receive a single touch or multi-touches. Further, the touch screen may be for example achieved by a resistive type, a capacitive type, an infrared type or an acoustic wave type. According to an exemplary embodiment, the display 130 may receive the gesture input through the touch screen by a user's body (e.g., fingers) or a touching device (e.g., a pointing device, a stylus, a haptic pen, etc.)

The display 130 displays various contents in response to the gesture input, and this will be described in connection with the user interface to be described later.

The first communicator 140 transmits the command/data/information/signal received from the input apparatus 200 to the image processor 120. Further, the first communicator 140 may transmit the command/data/information/signal received from the first controller 160 to the input apparatus 200.

The first communicator 140 according to an exemplary embodiment may receive a user's command from the input apparatus 100.

Specifically, the first communicator 140 may receive a command corresponding to change in coordinate values, e.g., at least one of X and Y coordinates, in response to a touch input to the touch sensor 210, and may receive a command corresponding to change in position sensed by the motion sensor 220. Further, the first communicator 140 may receive a command corresponding to a button selected in response to a user's selection to the button section 230.

The first communicator 140 may use wireless communication as a communication method between the display apparatus 100 and the input apparatus 200. The wireless communication may include Bluetooth, radio frequency (RF), ZigBee, infrared communication, etc.

The first communicator 140, according to an exemplary embodiment, is internally provided in the display apparatus 100. However, the first communicator 140 may be provided in the form of a dongle or a module and detachably connected to a connector of the display apparatus 100.

The first storage 150 stores data without limitation under control of the first controller 160. The first storage 150 is achieved by a flash memory, a hard-disc drive and the like nonvolatile storage medium. The first storage 150 is accessed by the first controller 160, and thus the controller 160 performs reading/recording/modifying/deleting/updating/etc. with regard to the data.

The data stored in the first storage 150 may for example include not only an operating system for operating the display apparatus 100, but also various applications, image data, additional data, etc. executable under the operating system.

The first storage 150 according to an exemplary embodiment may further store a table where commands matching with a user's inputs are tabulated. Specifically, commands matching with to drawing objects drawn by gesture inputs are tabulated in the table. For example, a rectangle may be matched with a search box, and a letter C may be matched with channel selection. Further, if a certain button, e.g., a blue button on the button section 230 is selected, a drawing object may appear in blue on the display 130 in response to the following gesture input. The kinds of commands to be matched with a user's input may be set and/or changed by a user.

The first controller 160 performs control with regard to various elements of the display apparatus 100. For example, the first controller 160 may control the image processor 120 to do image processing processes, and performs control corresponding to a command received through the input apparatus 110, thereby controlling the operations of the display apparatus 100.

The first controller 160 includes at least one processor. At least one processor loads a program from a nonvolatile memory (i.e., a read only memory), where programs are stored, to a volatile memory (i.e., a random access memory).

According to an exemplary embodiment, the first controller 160 is achieved by at least one universal processor such as a central processing unit (CPU), an application processor (AP), a microcomputer (MICOM) or the like, and for example runs a corresponding program loaded into the RAM by a predetermined algorithm stored in the ROM, thereby performing various operations of the display apparatus 100.

If the first controller 160 of the display apparatus 100 is achieved by a single processor, e.g., a CPU, the CPU may be provided to implement various functions implementable in the display apparatus 100, for example, control for various image processing processes, such as decoding, demodulating, scaling, etc. with regard to an image to be displayed on the display; response to a command received from the input apparatus 200 including the remote controller; control for wired/wireless network communication with the external apparatus; voice recognition; video call using a camera and a microphone; etc.

The first controller 160 may for example include a program which performs a certain function supported in the display apparatus 100, e.g., a function corresponding a command received from a user or from the input apparatus 200; and a chip, e.g., an integrated circuit (IC) chip which is provided as a processor dedicated for executing the corresponding program.

In response to a user's gesture input, the first controller 160 according to an exemplary embodiment controls the display 130 to display a drawing object corresponding to a path of the gesture input. The gesture input may be sensed through the touch sensor 210 and/or motion sensor 220 provided in the input apparatus 200. Further, the gesture input may be sensed through the touch screen of the display apparatus 100, an image sensor for sensing a hand gesture, etc.

The first controller 160 controls the display 130 to display a screen based on operation information stored in the first storage 150 in response to a command corresponding to a user's operation received from the input apparatus 200. For example, if a user's input to the touch sensor 210, i.e., a command corresponding to change in coordinate values is received, or if the motion sensor 220 senses that the input apparatus 200 moves in a predetermined direction/at predetermined speed, the controller 160 may control the display 130 to display a screen changed corresponding to the input.

Details of the displayed screen, including the drawing object, will be described later.

Below, details of the input apparatus 200 and a user's input to the input apparatus 200 will be described.

Figure 3:
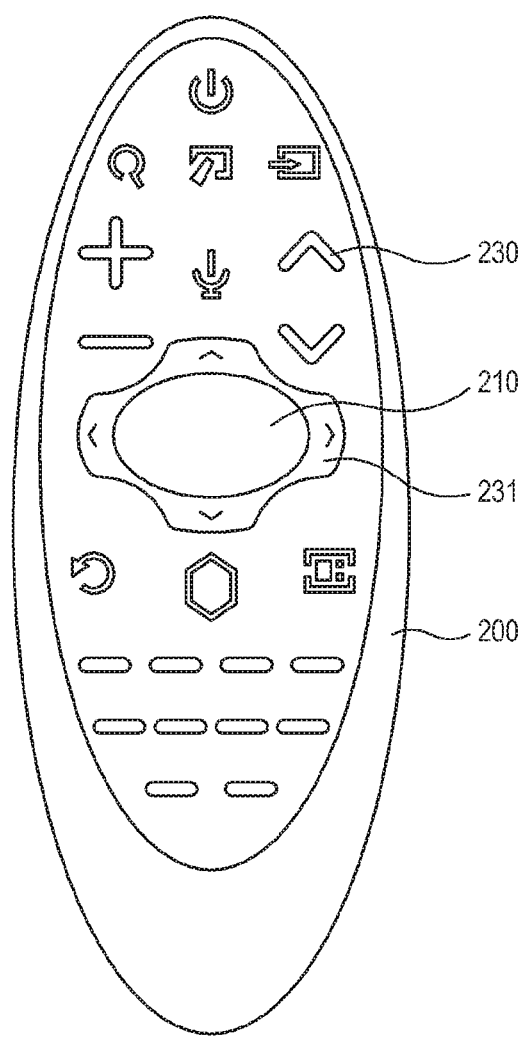
FIG. 3 is a perspective view of an input apparatus according to an exemplary embodiment.
Figure 6:
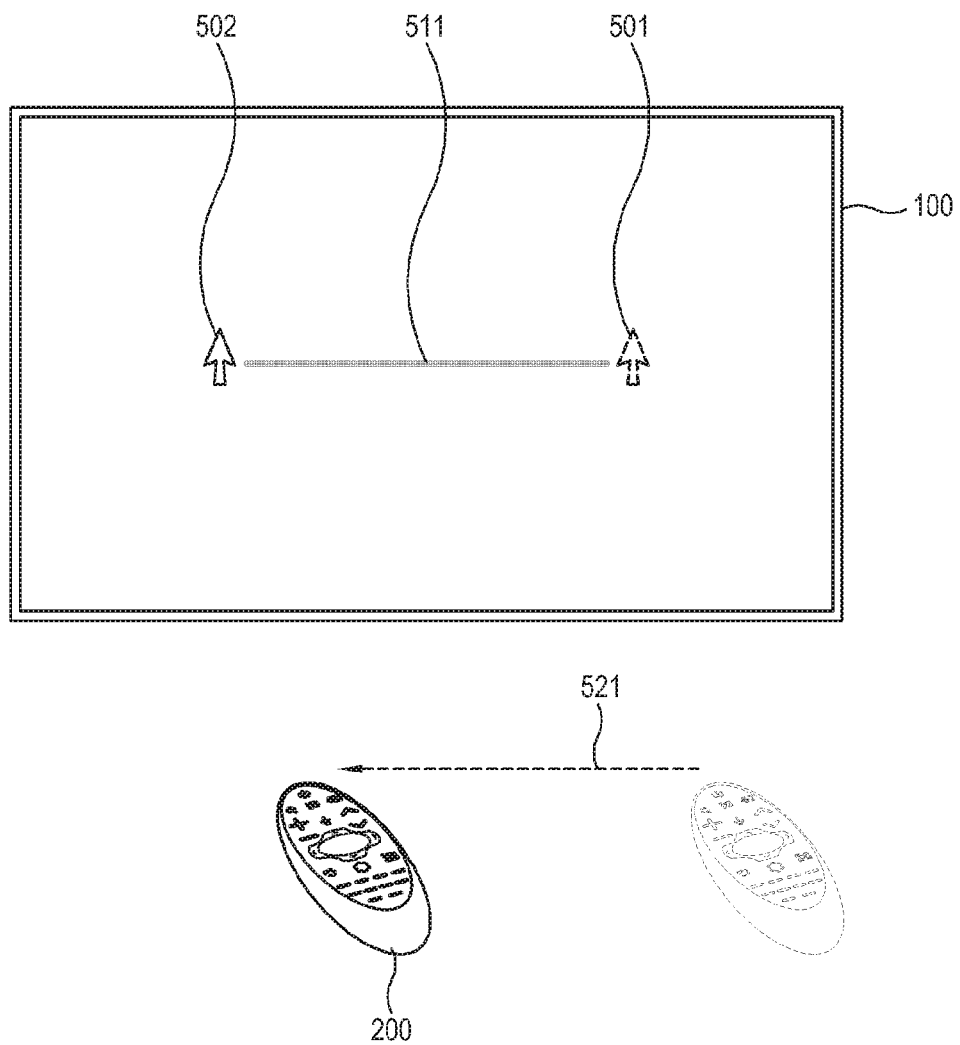

FIG. 3 is a perspective view of the input apparatus 200 according to an exemplary embodiment, and FIG. 4 to FIG. 6 illustrate an exemplary embodiment that a user's input is received through the input apparatus 200 of FIG. 3.

According to an exemplary embodiment, the input apparatus 200 may have an oval shape to be easily held by a user in one hand as shown in FIG. 3, and may for example be shaped like a pebble.

FIG. 3 illustrates an example where the input apparatus 200 has the oval shape, but not limited thereto. Alternatively, the input apparatus 200 may have an elongated rectangular shape, and may have any structure as long as it can be easily held by a user in one hand.

According to an exemplary embodiment, the input apparatus 200 may have a plurality of operation modes (hereinafter, referred to as input modes).

For example, the input apparatus 200 may operate in at least one of a touch mode to operate in response to a user's touch input to the touch sensor 210, a gesture mode to operate in response to a motion input, i.e., The motion of the input apparatus 200, a normal mode to operate in response to a user's input to the button section 230, a hand gesture mode to operate in response to motion of a user's hand, and a voice input mode to operate in response to a user's voice.

The input mode of the input apparatus 200 may be changed corresponding to a user's preset input (for example, an operation of a predetermined key button, a touch input stronger than a predetermined strength or longer than a predetermined distance, a motion input stronger than a predetermined strength, utterance of a trigger word, etc.

However, the present disclosure is not limited to the foregoing description. Alternatively, the input mode may be changed corresponding to various user's input.

According to an exemplary embodiment the input apparatus 200 includes at least one sensor to sense a user's gesture input. Here, at least one sensor includes the touch sensor 210 and the motion sensor 220. That is, the input apparatus 200 includes at least one between the touch sensor 210 and the motion sensor 220, and receives a user's gesture input.

According to an exemplary embodiment the gesture input includes an input based on a user's hand gesture, and the system 1 may additionally include a sensor for sensing the hand gesture. The sensor (e.g., the image sensor) for sensing the hand gesture may be placed a predetermined position of, e.g., in front of the display apparatus 100.

The touch sensor 210 may be achieved by a touch pad for sensing a user's touch input, and may be divided into an upper portion formed corresponding to an input area and a lower portion formed with a sensor for sensing a touch input.

A user's touch input may include a tap, a click stronger than the tap, a double-click, a drag of moving a touch by a predetermined distance, a slide, flicking, a swipe, etc. The input such as the drag, slide, flicking, swipe, etc. may include press of touching the touch sensor 210 with a finger (or a touch pen), movement by a predetermined distance, and release of releasing from the touch sensor 210, and includes any movement of drawing the straight line or the curved line. These touch inputs are includes in the gesture input.

When the touch sensor 210 senses a user's touch input, the second controller 260 generates a command corresponding to the sensed touch input and transmits it to the display apparatus 100 through the second communicator 240. The touch sensor 210 can sense a user's touch input using his/her finger, a touch pen, etc.

According to an exemplary embodiment, the touch sensor 210 may be provided as an elliptical form in the middle of the input apparatus 200 as shown in FIG. 3 and FIG. 4, on which a user's finger (or thumb) is naturally put on while holding the input apparatus 200 in his/her hand.

According to an exemplary embodiment, the touch sensor 210 may be variously placed and shaped in the input apparatus 200. For example, FIG. 3 and FIG. 4 show that the touch sensor 210 is provided to facilitate a touch input of a thumb, but not limited thereto. Alternatively, the input apparatus 200 may have various structures designed to facilitate a touch input in consideration of the structure of a human body while it is held by a user in his/her hand.

The display 130 of the display apparatus 100 may display a pointing cursor 401, 402 (hereinafter, referred to as a cursor or a pointer) at a position corresponding to a user's input on a screen thereof as shown in FIG. 4. The pointing cursor may move corresponding to the direction and distance of a user's touch input to the touch sensor 210. FIG. 4 illustrates that the cursor displayed on the display 130 moves from a first position 401 to a second position 402 in response to a user's touch input.

According to an exemplary embodiment, the display 130 of the display apparatus 100 may further display a drawing object 411 corresponding to the moving path (hereinafter referred to as a moving trajectory or a moving trace) of the gesture input 421 to the touch sensor 210.

For example, as shown in FIG. 4, if the touch sensor 210 receives a gesture input 421 in a rightward direction, the pointing cursor moves from a first position 401 to a second position 402, and the drawing object 411 may be displayed along the moving path.

The motion sensor 220 senses the moving direction, distance, speed, etc. of the input apparatus 200 in the gesture mode.

According to an exemplary embodiment, the motion sensor 220 includes a sensor for sensing the motion of the input apparatus 200, and includes at least one of a gyro sensor, an angular speed sensor and a geomagnetic sensor.

The motion sensor 220 measures acceleration and angular speed with respect to 3-axes or 6-axes of the input apparatus 200 in the current position of the input apparatus 200, and transmits measurement results to the second controller 260. The second controller 260 generates a command corresponding to the motion information of the input apparatus 200 and transmits the generated command to the display apparatus 100 through the second communicator 240.

The display 130 of the display apparatus 100 may display a pointing cursor 501, 502 at a position corresponding to a user's input on a screen thereof as shown in FIG. 5 and FIG. 6. The position of the pointing cursor may move corresponding to the moving direction and distance of the input apparatus 200. FIG. 5 and FIG. 6 illustrate that the cursor displayed on the display 130 moves from a third position 501 to a fourth position 502 in response to a user's touch input.

The display apparatus 100 according to an exemplary embodiment may further display a drawing object 511 showing a moving path of a gesture input 521 corresponding to the motion of the input apparatus 200.

For example, if the gesture input 521 of moving the input apparatus 200 from right to left is received as shown in FIG. 5, the pointing cursor is moved from the third position 501 to the fourth position 502, and the drawing object 511 is displayed corresponding to the moving path.

As shown in FIG. 3, the button section 230 includes the plurality of buttons provided to be operated by a user.

The plurality of buttons may include a power key, a menu key, a channel key, a volume key, a direction key, a numeral key, etc. The input apparatus 200 shown in FIG. 3 may for example include the power key, the channel keys, the volume keys and the direction keys 231.

According to an exemplary embodiment, the direction keys 231 of the input apparatus 200 respectively correspond to up, down, left and right, i.e., four directions, so that a user can move the cursor through the four direction keys 231. In the state that the display 130 displays a plurality of items, a user can select a desired item, for example, content by moving item by item through the direction keys 231.

According to an exemplary embodiment, the direction keys 231 may be placed at a position on which a predetermined finger (or a thumb) is naturally put as shown in FIG. 3 when the input apparatus 200 is hand in a hand.

FIG. 3 illustrates that the direction keys 231 are provided on the circumference of the elliptical touch sensor 210. According to an exemplary embodiment, the layout, position and shape the button section 230 including the direction keys 231 may be variously achieved.

For example, the button section 230 may further include a hotkey for directly entering a certain mode. The hotkey may be achieved in various shapes (for example, a circle, a triangle, a rectangle, a diamond shape, a star shape, a flower shape, etc.) and/or various colors (for example, red, yellow, blue, violet, etc.), and provided in the input apparatus 200. Details of the hotkey provided in the input apparatus 200 will be described later in connection with the UI.

According to an exemplary embodiment, if a predetermined button of the button section 230 is pressed, the input apparatus 200 may display a drawing object in response to a gesture input and perform a corresponding operation. For example, the display 130 displays a pointer on the screen thereof in response to an operation of a predetermined button provided on the input apparatus 200 (i.e., an operation of combination of two or more buttons or an operation of a separate button), and moves the pointer on the screen in response to the gesture input to at least one sensor of the input apparatus 200.

If the pointer moves from a certain position to another position, a drawing object is displayed corresponding to the moving path. If the shape of the moving path is previously designated for channel up/down, the first controller 160 of the display apparatus 100 determines the shape of the moving path and performs a preset channel up or down. For example, in the state that the pointer is placed in a lower position of a screen, if one straight line is drawn in an upward direction, one straight line is drawn as the drawing object on the screen in accordance with the moving path of the pointer. If drawing the line is stopped, the pointer also stops moving. The first controller 160 performs a predetermined function, i.e., an operation corresponding to channel up in accordance with the shape of the drawing object. Then, the line on the screen is erased to prepare for receiving a new command.

According to an exemplary embodiment the input apparatus 200 may further include a microphone as a voice input for receiving a voice.

The second communicator 240 communicates with the display apparatus 100 and supports communication standards corresponding to the first communicator 140. For example, the second communicator 220 receives and transmits a predetermined command through wireless communication. The wireless communication includes Bluetooth, RF, ZigBee, infrared, etc.

The second storage 250 stores a variety of pieces of data to be accessed by the second controller 260. Specifically, the second storage 250 according to an exemplary embodiment may include coordinate information set with respect to the touch sensor 210 to sense a user's touch inputs. Further, the second storage 250 may store information about the input modes of the input apparatus 200.

The second storage 250 may be achieved by a flash-memory and the like nonvolatile storage medium. The second storage 250 is accessed by the second controller 260, and thus the second controller 260 performs reading/recording/modifying/deleting/updating/etc. with regard to the data. Further, the second storage 250 may be omitted.

The second controller 260 performs control with regard to various elements of the input apparatus 200. For example, the second controller 260 senses various user inputs and transmits a corresponding command to the display apparatus 100 through the second communicator 240, thereby controlling the operations of the input apparatus 200. Thus, the display apparatus 100 can perform control operations corresponding to the commands.

The second controller 260 includes at least one processor. At least one processor loads a program from a nonvolatile memory (i.e., a read only memory), where programs are stored, to a volatile memory (i.e., a random access memory).

According to an exemplary embodiment, the second controller 160 is achieved by at least one universal processor such as an application processor (AP), a microcomputer (MICOM) or the like or by a chip provided as a dedicated processor such as an integrated circuit (IC) chip, and for example runs a corresponding program loaded into the RAM by a predetermined algorithm stored in the ROM, thereby performing various operations of the input apparatus 200.

If a user's input is sensed through at least one among the touch sensor 210, the motion sensor 220, the button section 230 and the voice input, the second controller 260 of the input apparatus 200 according to an exemplary embodiment transmits a corresponding control signal to the display apparatus 100.

The second controller 260 may send the display apparatus 100 the commands respectively corresponding to the gesture inputs sensed by the touch sensor 210 and/or the motion sensor 220.

For example, the second controller 260 may transmit information about the direction, distance, speed, etc. corresponding to a user's touch input sensed through the touch sensor 210, or information about the direction, distance, speed, etc. corresponding to the motion of the input apparatus 200 sensed through the motion sensor 220 as the corresponding commands to the display apparatus 100.

According to an above exemplary embodiment, the cursor on the display 130 is moved corresponding to the operations on the touch sensor 210 or the motion of the input apparatus 220, and thus instantaneous zapping is possible for a user who does "flick through" using his/her thumb or spatial motion of his/her hand. Therefore, fatigue due to a user's operation using the existing buttons is relieved, and thus ergonomic and closer interaction between a user and the display apparatus 100 is possible through the input apparatus 200.

According to an exemplary embodiment, there are no limits to the command issued to the display apparatus 100 in response to the gesture input to the touch sensor 210 and/or the motion sensor 220 of the input apparatus 200.

Specifically, if the input apparatus 200 senses the gesture input in the state that the display apparatus 100 is displaying a broadcast corresponding to a predetermined channel, the second controller 260 determines a command corresponding to the sensed input among the plurality of commands corresponding to the plurality of functions supported in the display apparatus 100, and controls the second communicator 240 to transmit a command for performing an operation corresponding to the determined command.

Further, various commands may be transmitted in accordance with contents displayed on the display apparatus 100. For example, if a web page is displayed on the display 130, the previous or next page may be displayed in response to the touch input or motion in horizontal directions (i.e., left and right directions), or the web page may be scrolled up or down in response to the touch input or motion in vertical directions (i.e., up and down directions).

According to an exemplary embodiment, various commands may be set to be issued in accordance with the kinds, strength, directions, moving distance, etc. of the gesture input based on the touch input to the touch sensor 210 and/or the motion sensed by the motion sensor 220, and this setting may be changed by a user's selection. For convenience of a user, operations to be performed in the display apparatus 100 in response to the gesture input may be set to be intuitively recognized by a user.

Information about the operations set corresponding to the kinds, strength, directions, moving distance, etc. of the gesture input may be stored in the first storage 150 of the display apparatus 100.

The second controller 260 of the input apparatus 200 may send the display apparatus 100 the information about the kinds, strength, directions, moving distance, etc. of the gesture input, which is received while sensing the gesture input.

The display apparatus 100 performs the operation set corresponding to the set information of the first storage 150 based on the received information. For example, the drawing object corresponding to the moving path of the gesture input may be displayed on the display 130.

According to an exemplary embodiment, the second controller 260 may set coordinate information with respect to the touch sensor 210, and calculate coordinates corresponding to a location where a user's touch input occurs. The second controller 260 transmits the calculated coordinate information as a predetermined command to the display apparatus 100 via the second communicator 240.

Specifically, the second controller 260 of the input apparatus 200 senses increase or decrease in a value of the X coordinate and the Y coordinate with respect to the touch gesture input received from the touch sensor 210, and thus generates a corresponding command (e.g., an event), thereby transmitting the command to the display apparatus 100 through the second communicator 240.

For example, if there is a swiping gesture input to the touch sensor 210, the second controller 260 may generate a command (e.g., an event) based on a coordinate value at a press location, a coordinate value at a release location, and whether the coordinate values at the press and release locations are increased or decreased with respect to the X coordinate or the Y coordinate. The first controller 160 of the display apparatus 100 controls the display 130 to display the drawing object based on the event of the change in the coordinate value.

According to an exemplary embodiment the motion sensor 220 of the second controller 260 may calculate information about up, down, left and right motions and/or rotation of the input apparatus 200 moving in a space. The second controller 260 transmits the calculated information as a predetermined command to the display apparatus 100 through the second communicator 220.

For example, the second controller 260 of the input apparatus 200 senses increase or decrease in spatial coordinate values in up and down/left and right directions with respect to the motion gesture input sensed by the motion sensor 220, and generates a corresponding command (i.e., an event), thereby transmitting the command to the display apparatus 100 through the second communicator 240.

The first controller 160 of the display apparatus 100 controls the display 130 to display a drawing object based on an event of change in the coordinate values.

The motion sensor may be provided in a main body of the display apparatus 100. For example, the first controller 160 of the display apparatus 100 may sense a user's hand gesture through the image receiver (e.g., an image sensor of a camera) provided in the front thereof.

The strength of the hand gesture may be determined by one of a moving distance, a moving speed and an area of a moving region of a hand or combination thereof. The first controller 160 calculates the motion information of the hand gesture based on angular speed and acceleration of the hand sensed by the image sensor, and amends the calculated motion information by comparison with the information stored in the first storage 150. The result of comparison or amendment may be used as a predetermined command for controlling the display apparatus 100.

According to an exemplary embodiment, the input apparatus 200 may additionally include a voice receiver such as a microphone to receive a voice uttered by a user, and the like various user input units. The microphone may sense a frequency swing.

The audio input unit may be provided in the main body of the display apparatus 100, and a image input unit such as a camera may be provided in the front of the display apparatus 100.

According to an exemplary embodiment, the input apparatus 200 may receive a user's input based on combination of two or more various user inputs described as above. For example, the motion gesture input may be received while the touch sensor 210 is being touched. Information about commands corresponding to such various combinations of a user's inputs may be stored in the first storage 150, the second storage 250, or a separate server including a cloud sever or the like.

According to an exemplary embodiment, the input apparatus 200 may include various sensors, for example, an accelerating sensor, a gravity sensing sensor, various gyroscope sensors, a geomagnetic sensor, a digital compass sensor, a proximity sensor, an optical sensor, etc. and communicate with various external apparatuses such as the display apparatus 100.

Further, the input apparatus 200 may further include an output section to indicate its operating state. For example, the input apparatus 200 may include an indicator achieved by a light emitting diode (LED) or the like, so that the operating state of the input apparatus 200 can be indicated with light. Here, the second controller 260 may variously indicate the operating state by adjusting the color or brightness of the indicator, by selecting a predetermined number of flickering times corresponding to a certain operation, etc. The operating state includes the operation mode of the input apparatus 200.

The output section may include a vibrator, a sound output unit for making a beep sound, etc. so that a user can be informed of the operating state of the input apparatus 200 through vibration, a beep or the like. The output section indicates a corresponding operating state when a control signal is received from the display apparatus 100, when an error occurs, and so on. Further, the output section may periodically output light, sound, vibration, etc. in order to inform where of the input apparatus 200 is located.

Below, interaction between the display apparatus 100 and a user using the input apparatus 200 will be described.

According to one or more exemplary embodiments described below, screens show drawing objects corresponding to moving paths of a user's gesture inputs. Here, a user's gesture input may be sensed by at least one sensor provided in the input apparatus 200, i.e., at least one of the touch sensor 210 and the motion sensor 220. Further, the gesture input may be received through a hand gesture sensed by the image sensor provided in the main body, for example, in front of the display apparatus 100, and by the display 130 including the touch screen.

According to one or more exemplary embodiments, the gesture input is received through the touch sensor 210 or the motion sensor 220, but not limited thereto. Alternatively, the gesture input may be received in various different ways.

FIG. 7 to FIG. 11 illustrate an exemplary embodiment in which a search box is generated and displayed in response to a gesture input;

The first controller 160 of the display apparatus 100 determines a command corresponding to a sensed gesture input among a plurality of commands corresponding to a plurality of functions supported in the display apparatus 100 in response to the gesture input sensed in various ways, and performs an operation corresponding to the determined command.

Figure 8:
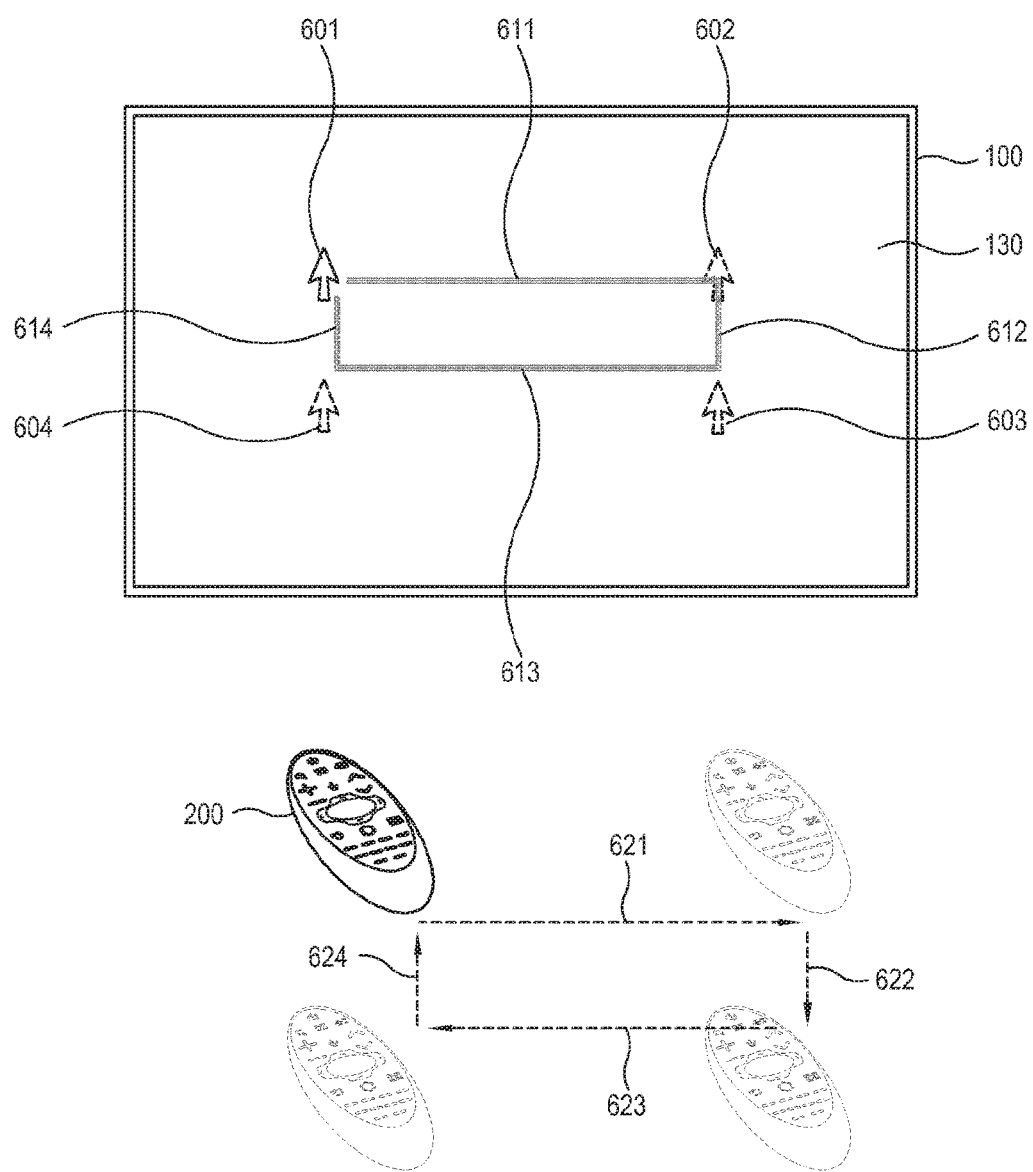

As shown in FIG. 7 and FIG. 8, a user may make sequential gesture inputs 621, 622, 623 and 624 of drawing a predetermined figure, e.g., a rectangle on the display 130 through the input apparatus 200 while an image is being displayed.

The second controller 260 senses a user's gesture input through the motion sensor 220, and controls the second communicator 240 to transmit motion information of the gesture input, i.e., the direction, distance, speed, etc. of the motion to the display apparatus 100.

The first controller 160 receives the motion information of the gesture inputs through the first communicator 140, and determines a command, i.e., a function corresponding to the gesture inputs 621, 622, 623 and 624 with reference to the set information of the first storage 150.

Figure 9:
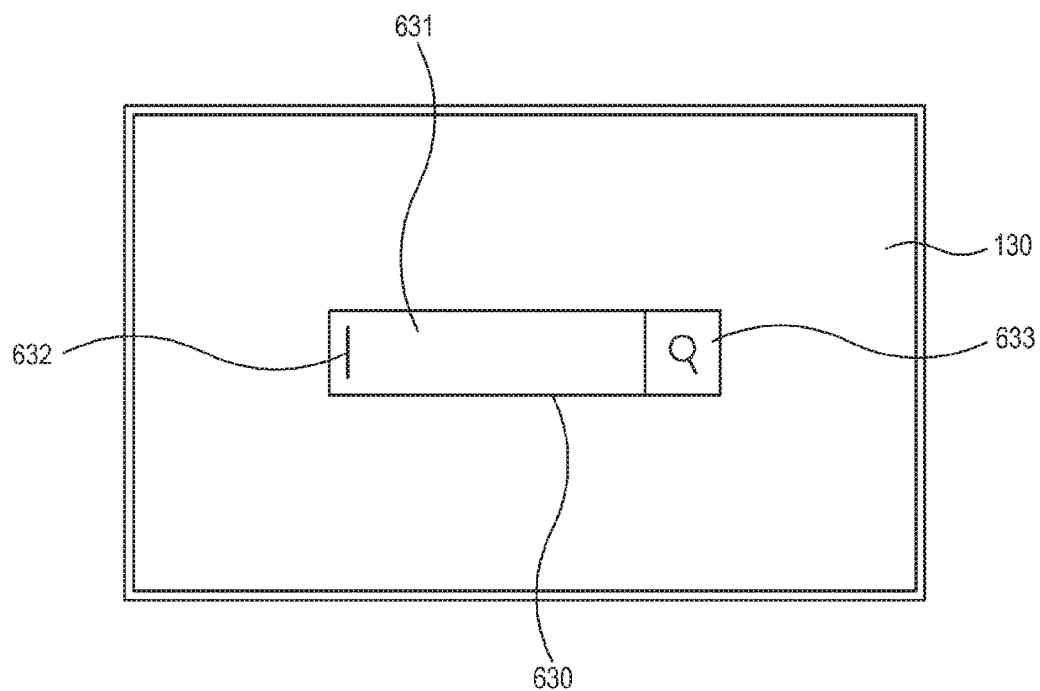

Specifically, the first controller 160 may determine the gesture inputs 621, 622, 623, 624 of drawing a rectangle, as a command for generating a search box as shown in FIG. 9. Further, the first controller 160 controls the display 130 to display a user interface 630 corresponding to the determined command, i.e., the generation of the search body.

The user interface 630 displayed as shown in FIG. 9 may correspond to drawing objects 611, 612, 613 and 614 corresponding to the moving path of the gesture inputs 621, 622, 623 and 624 received through the input apparatus 200 as shown in FIG. 7 and FIG. 8.

In other words, referring to FIG. 7 and FIG. 8, the pointing cursors 601, 602, 603 and 604 of the display 130 are moved corresponding to a user's gesture inputs 621, 622, 623 and 624, and the drawing objects 611, 612, 613 and 614 corresponding to the moving path are displayed on the display 130.

The first controller 160 displays the drawing objects 611, 612, 613 and 614 corresponding to the moving path in response to the sensed gesture inputs 621, 622, 623 and 624, and determines the generation of the search box as the corresponding command.

Thus, the display 130 displays the search box as the user interface 630 corresponding to the drawing objects 611, 612, 613 and 614 as shown in FIG. 9.

As shown in FIG. 9, the generated user interface 630 may include a search box 631 where a search word is input, a cursor 632 located inside the user interface 630, and a button 633 for receiving a search instruction of a user.

Figure 10:
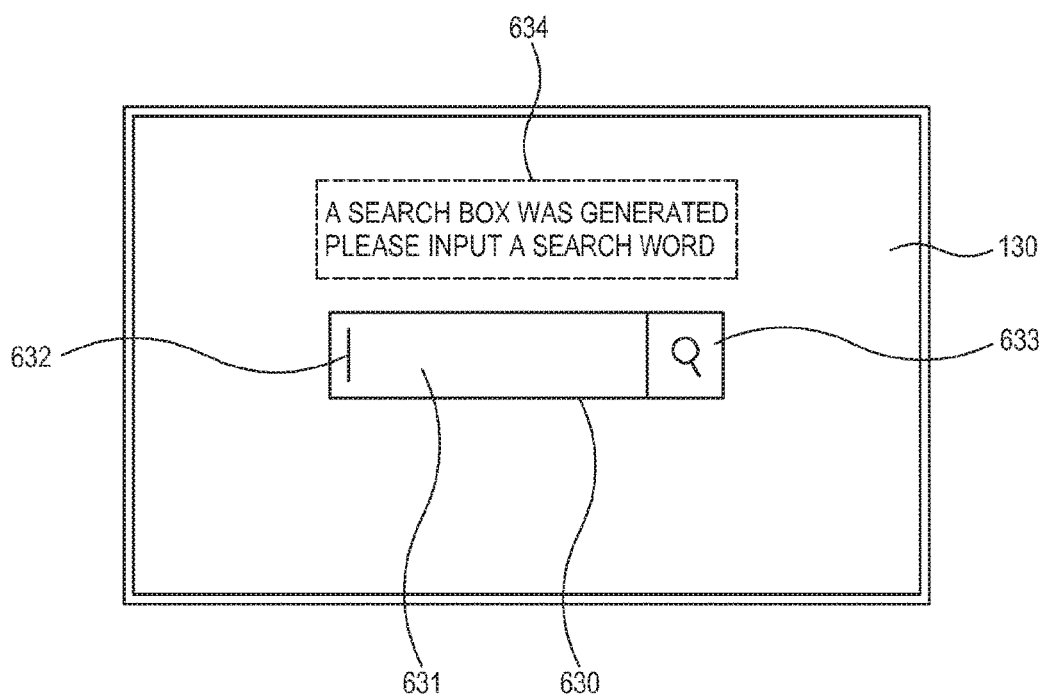

The first controller 160 may give a user feedback on that the search box 631 is generated in response to the gesture input, through the display 130. FIG. 10 shows that a message 634 about the generation of the search box is displayed on the display 130 as one of feedback methods. Through the message 634, a user can be informed that the operation corresponding to the gesture inputs 621, 622, 623 and 624 of drawing a rectangle (i.e., the generation of the search box) is normally performed.

Further, the display apparatus 100 according to an exemplary embodiment may give a user the feedback in such a manner of giving an animation effect to the generated search box 631. For example, when the search box 631 is generated as shown in FIG. 9, the feedback on the generation of the search box may be given to a user by an animation effect that the corresponding search box flickers for a predetermined time.

The display apparatus 100 may receive a search keyword through the search box 631 generated by a user, thereby allowing him/her to search for various keywords.

Figure 11:
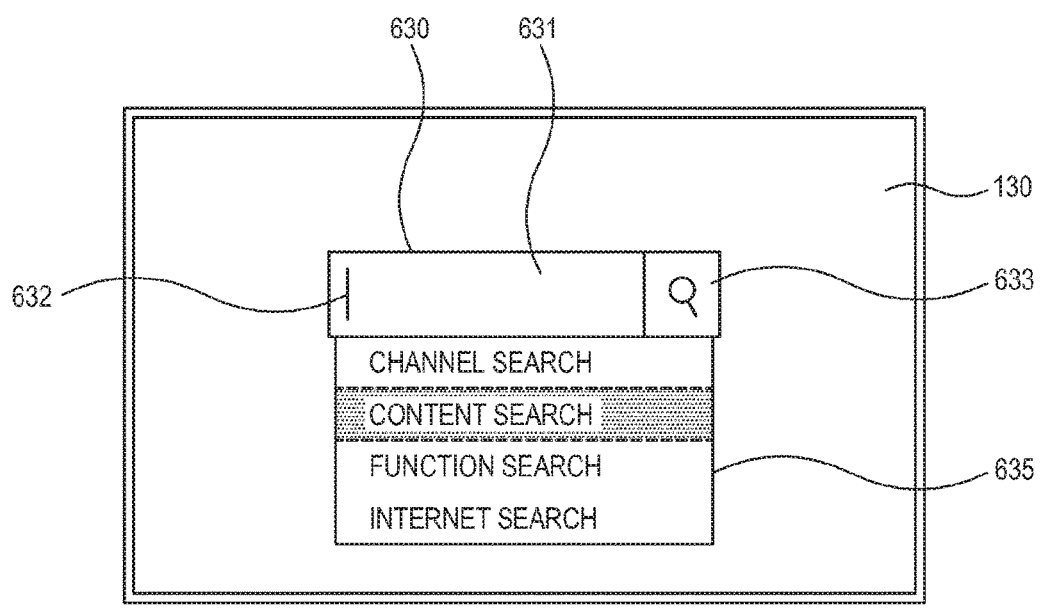

According to an exemplary embodiment, the user interface 630 including the search box 631 may include a drop-down window 635 (or a pull-down window) where a plurality of items corresponding to a search range (or search target) is displayed as submenus as shown in FIG. 11. Thus, a user can select the search range on the drop-down window 635.

For example, as shown in FIG. 11, if a user selects a content search item and inputs a predetermined keyword, the first controller 160 searches for content including the input keyword from the content stored inside the display apparatus 100 or at the outside (e.g., an external disc, a cloud server, etc.), and displays a search result on the display 130.

There are various methods of inputting a keyword. For example, a keyword may input as a gesture input using the touch sensor 210 or the motion sensor 220 of the input apparatus 200. For example, a keyword may be input in such a manner that a user writes a letter corresponding to the keyword in a space with the input apparatus 200 held in his/her hand.

If an enter command is input after a user inputs a keyword, i.e., a word desired to be searched for, search related to the word is performed. Here, the enter command may be input by receiving a gesture input corresponding to a shape matching with the enter command on a screen outside the box 630 including the search box 631.

According to an exemplary embodiment, the first controller 160 of the display apparatus 100 may determine the command corresponding to the gesture input based on a first user interface displayed on the display 130.

For example, in the state that the search box 631 is displayed as the first user interface on the display 130 as shown in FIG. 9, a user may input a prefix for determining the search range in the corresponding search box 631.

FIG. 12 to FIG. 15 illustrate an exemplary embodiment in which "TV+" 641 is input as prefix to the search box 631.

Figure 12:
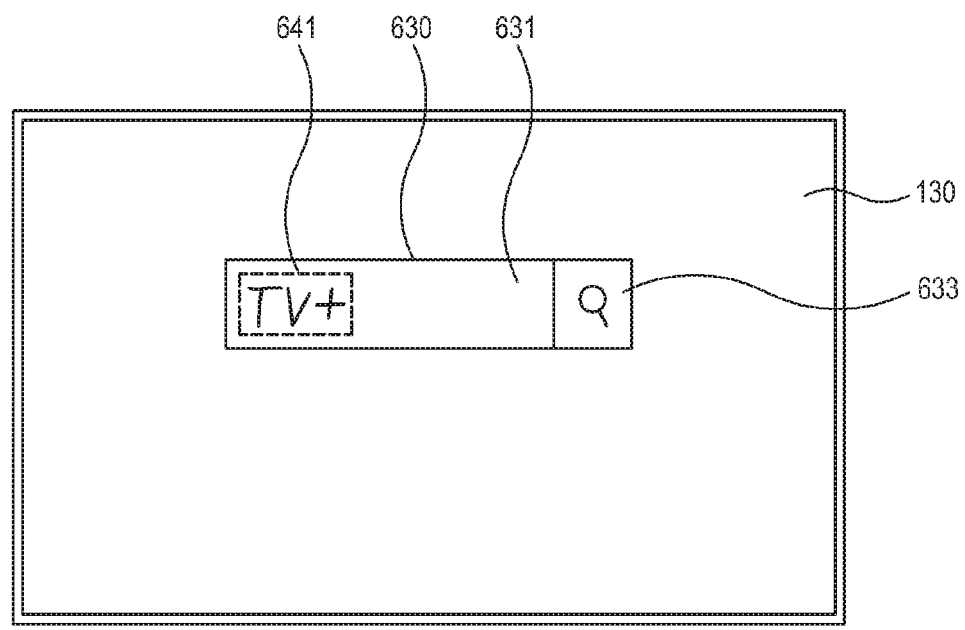

If "TV+" 641 is input as shown in FIG. 12 in the state that the search box 631 is displayed, the first controller 160 determines the corresponding prefix as the command of searching for menus or functions supported in the display apparatus 100, i.e., the TV.

Figure 14:
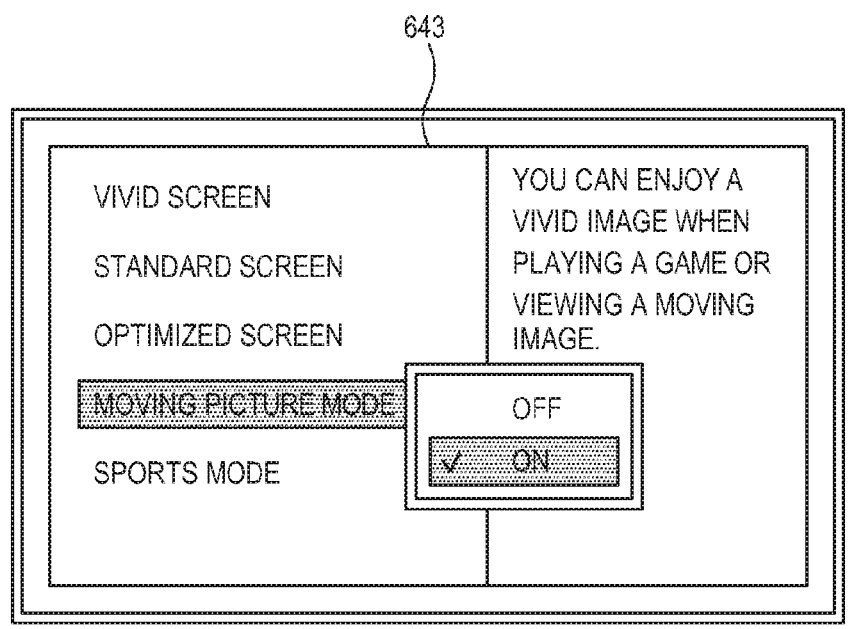

If a "screen mode" 642 is input as a keyword as shown in FIG. 13, the first controller 160 controls the display 130 to display a second user interface corresponding to a screen mode menu 643 selectable by a user as a search result as shown in FIG. 14.

Figure 15:
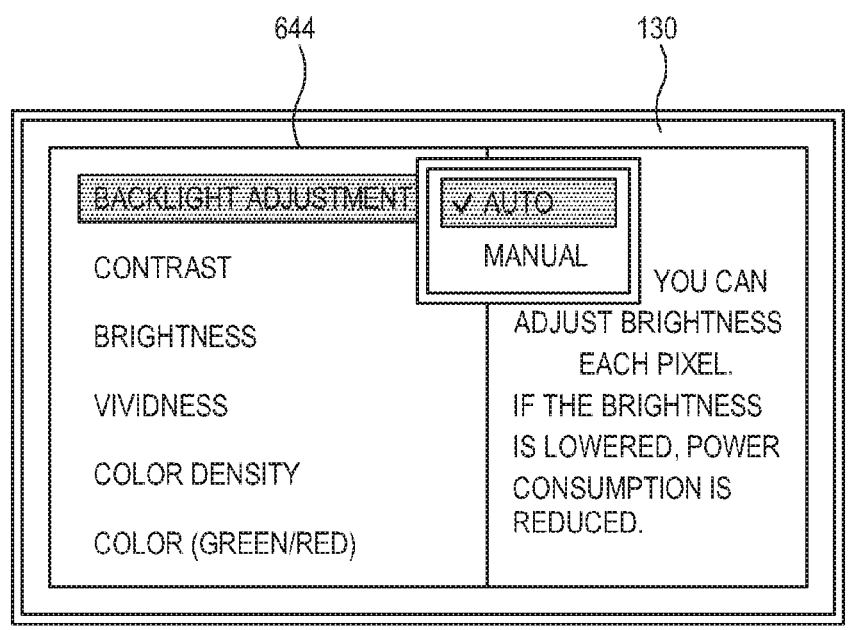

Likewise, if "image quality adjustment" is input, the first controller 160 controls the display 130 to display a second user interface corresponding to an image quality adjustment menu 644 selectable by a user as a search result as shown in FIG. 15

Thus, a user can select a desired item on the displayed menu 643 or 644 so that a corresponding function can be executed.

According to one or more exemplary embodiments, illustrated in FIG. 13 to FIG. 15, the prefix and/or keyword may be input in various ways. For example, the prefix and/or keyword may be input by the touch gesture input using the touch sensor 210 of the input apparatus 200 as shown in FIG. 13. Further, the prefix and/or keyword may be input through the gesture input using the motion sensor 220, the hand gesture, the touch screen, etc. and may be input a keyboard, a mouse, etc. communicating with the display apparatus 100.

Further, a prefix to be input may be variously set besides "TV+", and information about operations corresponding to the prefixes may be stored in the first storage 150. According to an exemplary embodiment, the display apparatus 100 may include operations corresponding to the prefixes may be modified and added by a user.

Figure 16:
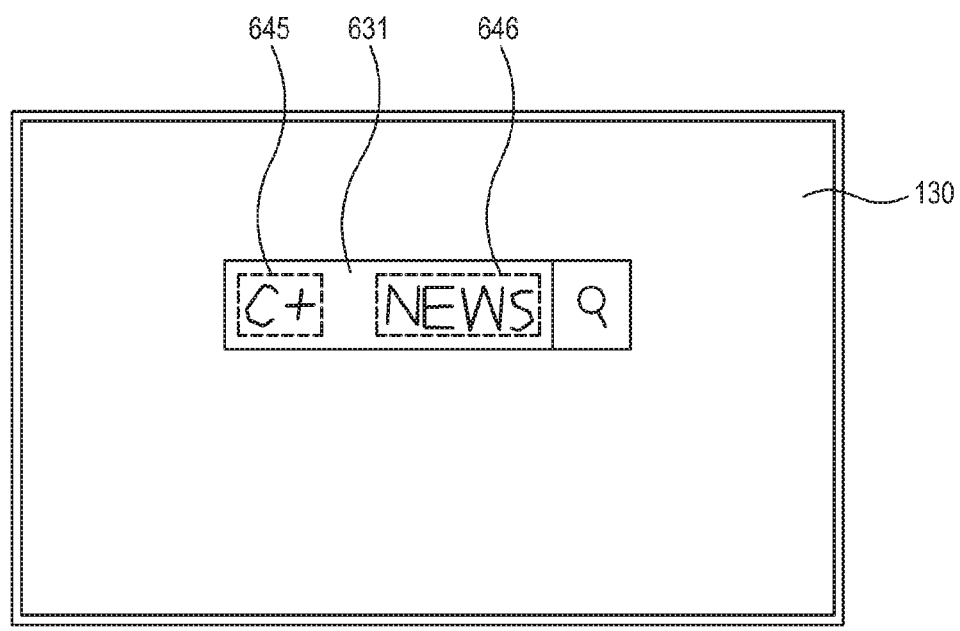
Figure 17:
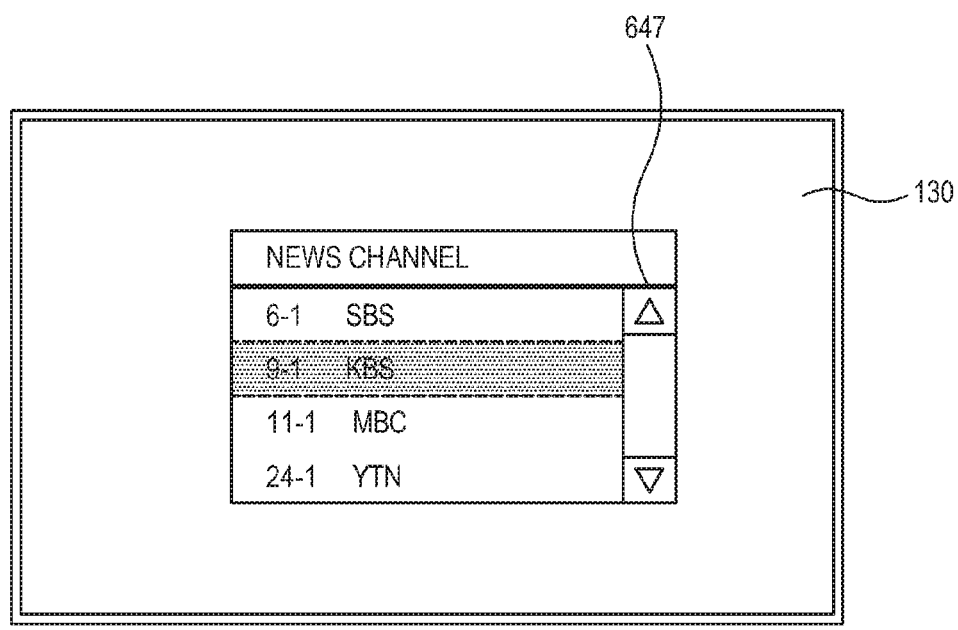

FIG. 16 to FIG. 17 illustrate an exemplary embodiment in which "C+" 645 is input as a prefix to the search box 631.

As shown in FIG. 16, if "C+" 645 is input as a prefix to the search box 631, the search range may be determined as a TV channel. In the state that "C+" 645 is input as the prefix, if a user inputs "news" 646 as a keyword, the first controller 160 determines a command of searching for news channels.

Then, a channel list 647 including news channels (e.g., KBS, SBS, YTN, etc.) and selectable by a user may be displayed as the second user interface on the display 130 as shown in FIG. 17.

Thus, a user can view news by selecting a desired channel from the displayed channel list 647.

In addition, if the gesture input of drawing the rectangle is input as shown in FIG. 7 and FIG. 8 while the display 130 is displaying a broadcast image, the search target of the search box 631 generated in FIG. 9 may be limited to channels being currently broadcasted.

Further, if the gesture input of drawing the rectangle is input as shown in FIG. 7 and FIG. 8 while the display 130 is displaying an initial screen (i.e., a smart home screen), the search target of the search box 631 generated in FIG. 9 may be limited to the functions of the display apparatus 100 or the information stored in the display apparatus 100.

The search box 631 generated as described with reference to FIG. 7 to FIG. 9 may be determined to perform internal search for the functions supportable in the display apparatus 100 and external search on the Internet.

The first controller 160 may control the display 130 to generate the search box for performing one of the internal search and external search, based on at least one of the shape and the object of the drawing object corresponding to the gesture input and a user input previous to the gesture input.

The internal search may include search for the functions supportable in the display apparatus 100, search for content stored in the first storage 150, channel search, etc. The external search may include search on the Internet, search for data stored in other devices (e.g., a user terminal including a smart phone, a smart pad, a desk top computer, a laptop computer, etc.) capable of communicating with the display apparatus 100.

Figure 18:
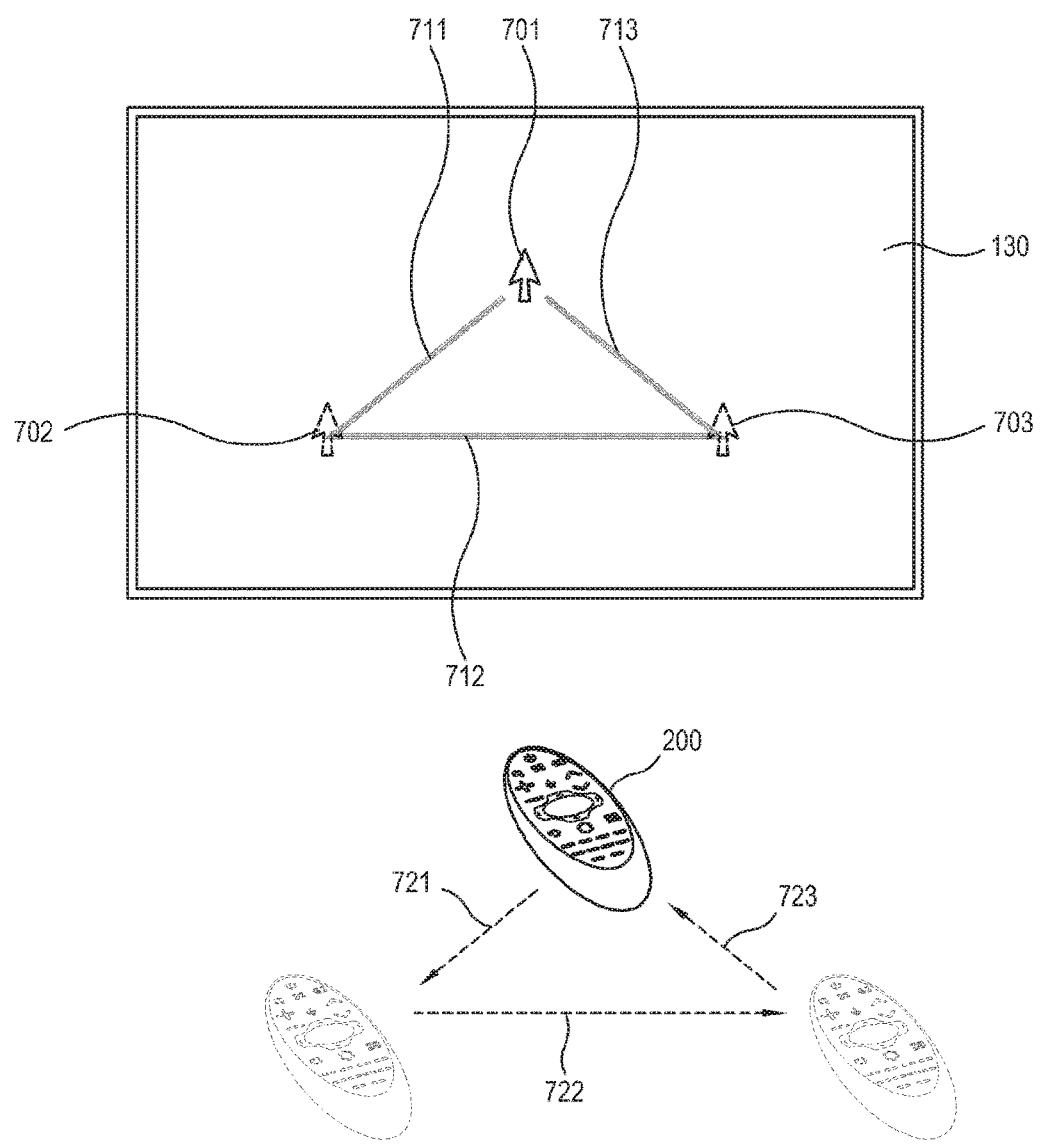
FIG. 18 to FIG. 20 illustrate an exemplary embodiment in which a search target is selected based on a shape of a drawing object.
Figure 19:
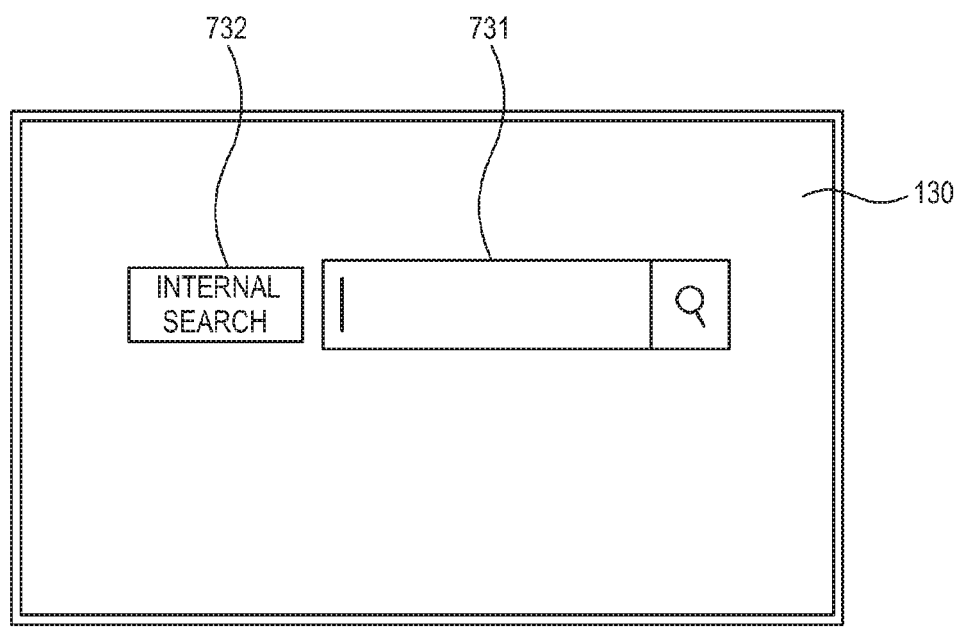
Figure 20:
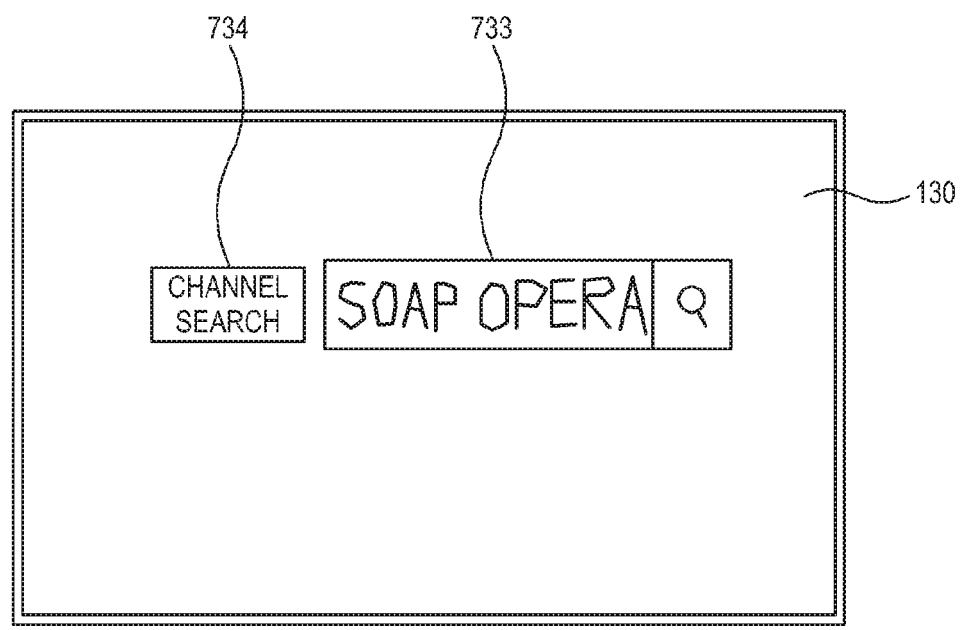

FIG. 18 to FIG. 20 illustrate an exemplary embodiment in which a search target is selected based on a shape of a drawing object.

As shown in FIG. 18, if gesture inputs 721, 722 and 723 of drawing a triangle are received from a user, the first controller 160 displays drawing objects 711, 712 and 713 on the display 130 while moving a cursor 701, 702, 703 along the motion.

The first controller 160 determines the shape of the displayed drawing objects 711, 712 and 713 is a triangle, and controls the display 130 to generate and display a search boy 731 as a corresponding command for performing the internal search. Here, the display 130 may display a message 732 about the corresponding search target together with the search box 731. To this end, the table of the first storage 150 may store information about the kind of search boxes matching with the shape of the gesture inputs, i.e., the drawing objects.

FIG. 18 illustrates that the shape of the drawing objects corresponding to the gesture inputs is a triangle, but not limited thereto. Alternatively, the kind of search boxes may be matched with various gesture inputs having various shapes such as a circle, a diamond shape, a star shape, a flower shape, etc. as well as the triangle and the rectangle. Further, the shape of the drawing object may be not limited to the figure, and alternatively may variously correspond to a numeral, a letter, at least one between a straight and curved lines having directivity, combination thereof, etc.

Further, the kind of search boxes may be variously modified/added as well as the internal search and the external search. For example, the kind of search boxes may include channel search, content search, function search, and Internet search as shown in FIG. 11.

In this case, the first storage 150 may store the kind of gesture inputs matching with these four searches. For example, if gesture inputs of drawing a letter "C" and a rectangle are received in sequence, a search box 733 for channel search may be displayed together with a message 734 as shown in FIG. 20.

At this time, a user may for example input a "soap opera" as a keyword to the search box 733 of FIG. 20, and the first controller 160 may control the display 130 to display a list of soap opera channels in accordance with search results.

According to an exemplary embodiment, the button section 230 of the input apparatus 200 may include a plurality of buttons as hotkeys corresponding to the kind of search boxes. The buttons corresponding to the hotkeys may be different in shape or color from other buttons, e.g., the channel key, the volume key, the power key, etc.

According to an exemplary embodiment, the first controller 160 of the display apparatus 100 may determine a command corresponding to a gesture input based on a user's input previous to the gesture input. Here, a user's previous input includes a user's selection about one (e.g., the hot key) among the plurality of buttons provided as the button section 230 on the input apparatus 200.

For example, if a user presses a yellow button matching with the external search and then makes gesture inputs of drawing a rectangle, the first controller 160 generates a search box corresponding to the external search and displays it on the display 130. Here, the gesture input of drawing the rectangle may be made while a user is pressing the yellow button.

The buttons corresponding to the hotkeys may be provided in the input apparatus 200, having various colors such as red, blue, violet, etc. as well as yellow.

Further, according to an exemplary embodiment, the hotkeys may be distinguished by not color but shape. In this case, the buttons designated for the hotkeys may have various shapes such as a triangle, a rectangle, a circle, a star shape, a flower shape, etc.

FIG. 21 illustrates an exemplary embodiment in which the gesture input is received through the hotkeys of the input apparatus 200, in which the shapes of the hot keys correspond to a circle 235, a triangle and a flower shape.

As shown in FIG. 21, if a user makes a gesture input 821 of drawing a circle in a space while pressing a circle button 235, a cursor 801, 802 moves corresponding to the gesture input on the display 130 and thus a drawing object 811 is displayed corresponding to the moving path. The first controller 160 determines the pressed button 235 and the kind of gesture input, and generates a search box corresponding to a command, for example, the external search based on the determined button, thereby displaying the search box on the display 130.

The color of the drawing object 811 displayed on the display 130 may be determined corresponding to the pressed button. For example, the drawing object may appear in red if the circle button 235 is pressed, and appear in blue if the rectangular button is pressed. FIG. 21 illustrates that a user makes the gesture input while pressing the button, but not limited thereto. Alternatively, a user may make a gesture input within a predetermined time (for example, within 3 seconds) after pressing the button.

According to an exemplary embodiment, a user's previous input may be not limited to the operation of the button. Alternatively, a user's previous input may include a voice input, a gesture input, etc.

For example, if a user utters a voice "Internet" and then makes a gesture input of drawing a rectangle, the first controller 160 recognizes it as the Internet search, and controls the display 130 to generate and display a search box for Internet search as a drawing object corresponding to the gesture input.

Further, if a user previously makes a gesture input of drawing an "i" and then makes a gesture input of drawing a rectangle, the first controller 160 recognizes it as the internal search and controls the display 130 to generate and display a search box for the internal search as a drawing object corresponding to the gesture input.

By the way, the command corresponding to the gesture input is not limited to the search box. For example, if a user previously makes a gesture input of drawing a numeral "1" and then makes a gesture input of drawing a letter "C", the first controller 160 may control the display 130 to display a list of channels including the numeral of "1". Below, this will be described in more detail.

According to an exemplary embodiment with reference to FIG. 4 to FIG. 21, the command corresponding to the gesture input is to generate the search box, but not limited thereto. Alternatively, operations corresponding to various commands may be implemented in response to the gesture input. For example, a certain search target may be directly searched in response to the gesture input without generating the search box.

Figure 22:
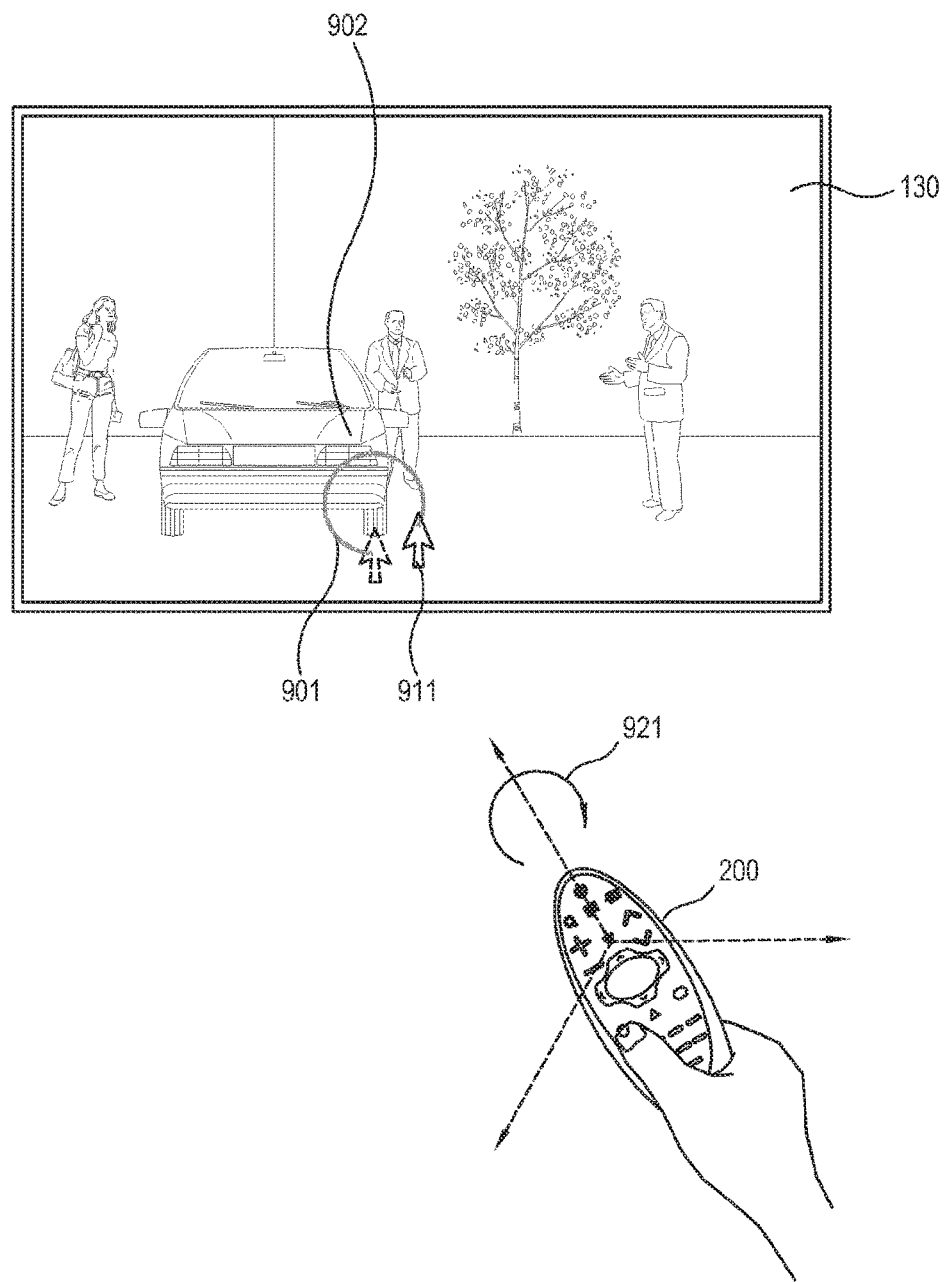
FIG. 22 and FIG. 23 illustrate an exemplary embodiment in which the display apparatus performs a search in response to the gesture input.
Figure 23:
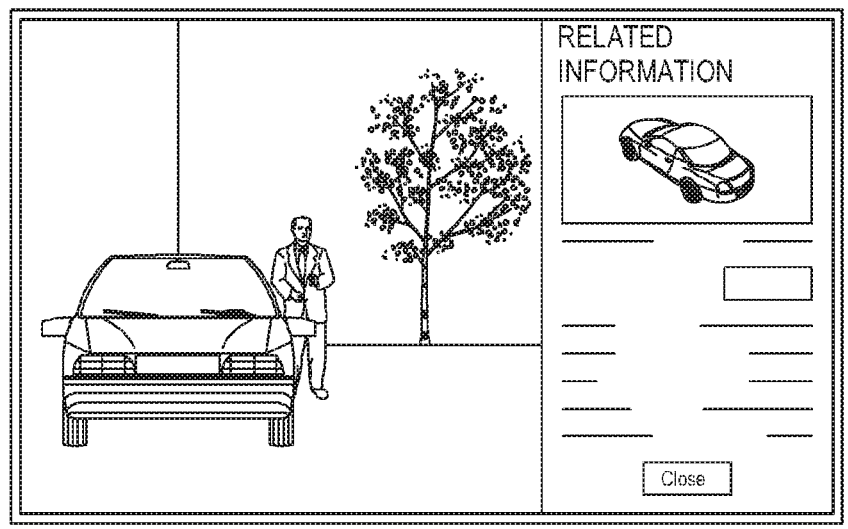

FIG. 22 and FIG. 23 illustrate an exemplary embodiment in which the display apparatus performs a search in response to the gesture input;

As shown in FIG. 22, while a broadcast image is being displayed, a user may make a gesture input 921 of drawing a circle at a position corresponding to a search target, for example, a car 902. Here, the broadcast signal corresponding to the displayed image received in the display apparatus 100 may for example involve data information of a car, a bag, clothes, etc.

The first controller 160 of the display apparatus 100 senses that the gesture input 921 is received at the position of the car 902, and controls the display 130 to display the drawing object 911 corresponding to the moving path of the gesture input 921 while moving the cursor 901, 911 corresponding to the moving path.

The first controller 160 determines the command corresponding to the gesture input as search for goods corresponding to the position 902 where the gesture input is received, and implements the search for the corresponding car as shown in FIG. 23, thereby displaying the search results. In addition, the first controller 160 may previously inform a user that there is information about goods by giving flickering, highlighting or the like effect to the car, i.e., the search target.

In FIG. 22, the gesture input may have various shapes or colors. That is, FIG. 22 illustrates an example that the gesture input of drawing the circle is received, but not limited thereto. Alternatively, the gesture input may have various shapes such as a triangle, a rectangle, a letter of "V", etc.

The first controller 160 may determine the search target in accordance with the shapes of the received gesture input. For example, the gesture input of drawing a circle may correspond to general information about a name of goods (for example, a car), the gesture input of drawing a triangle may correspond to price comparison of goods, and the gesture input of drawing "V" may correspond to search for dealers in the goods.

The search target of the gesture input may be varied depending on the kinds of buttons for a user's previous input, for example, the kinds of buttons provided as the hotkeys as described with reference to FIG. 21. In other words, if the gesture input of drawing a circle is made while the circular button 235 is pressed as shown in FIG. 22, the general information about the goods will be searched and displayed.

Further, the color of the drawing shown in FIG. 22 may be varied depending on the kinds of user's previous input, and the search target may correspond to the color of the drawing object.

Below, a control method of the display system 1 including the input apparatus 200 and the display apparatus 100 according to an exemplary embodiment will be described.

Figure 24:
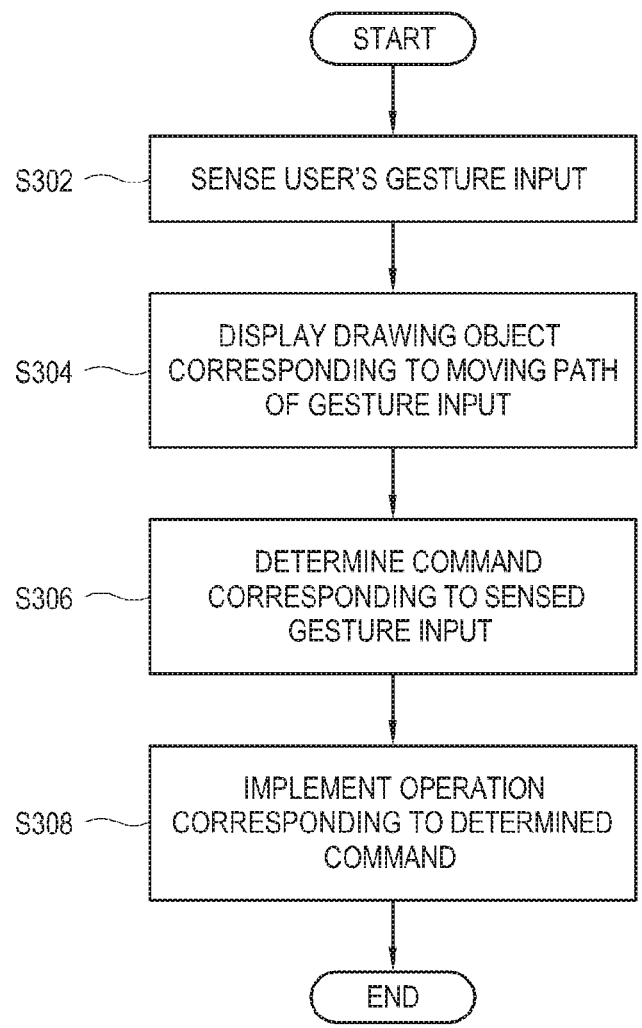
FIG. 24 is a flowchart of controlling the display system according to an exemplary embodiment.

FIG. 24 is a flowchart of controlling the display system 1 according to an exemplary embodiment.

As shown in FIG. 24, the display system 1 senses a user's gesture input (S302). A user's gesture input may be sensed by at least one sensor of the input apparatus 200 and the display apparatus 100. For example, the gesture input may include a touch gesture input to the touch sensor 210 of the input apparatus 200, or a motion gesture input sensed by the motion sensor 220. Further, the gesture input may include a hand gesture input sensed by the image sensor provided in front of the display apparatus 100, or a touch gesture input sensed by the touch screen of the display 130. If the gesture input is sensed through the input apparatus 200, the motion information of the input apparatus 200 is sent to the display apparatus 100.

In the operation S302, a user may make a gesture input of drawing a figure, a letter, a numeral and at least one of a straight line or a curved line having directivity on the touch screen of the touch sensor 210 or in a space to be sensed through the motion sensor 220 or the image sensor. Such a gesture input may include a user's previous input. In other words, a user may make the gesture input through the touch sensor 210 or the motion sensor 220 while pressing a hotkey designated for a certain function provided in the input apparatus 200 or within a predetermined time after pressing the hotkey.

The first controller 160 of the display apparatus 100 controls the display 130 to display a drawing object corresponding to the moving path of the gesture input in response to the gesture input sensed in the operation S302 (S304). The drawing object may correspond to a figure, a letter, a numeral and at least one between the straight and curved lines having directivity.

The first controller 160 of the display apparatus 100 may determine a command corresponding to the gesture input sensed in the operation S302 (S306). The first controller 160 may determine a command corresponding to the gesture input sensed in the operation S302 among the plurality of commands corresponding to the plurality of functions supportable in the display apparatus 100, in response to the sense of the gesture input. Further, the command determined in the operation S306 may be determined based on at least one of content displayed on the display 130, the user interface and a user's input previous to the gesture input.

The first controller 160 implements an operation corresponding to the command determined in the operation S306 (S308). The determined command may displaying a user interface corresponding to a predetermined function, and thus a user interface, for example, a search box may be displayed on the display 130.

According to an exemplary embodiment, the search range of the search box generated in the operation S308 may be determined based on the characteristics (e.g., the shape, the color, etc.) of the gesture input in the operation S302, or a user's input (e.g., the shape, the color, etc. of the button corresponding to the hotkey) previous to the gesture input.

A user may make another gesture input (i.e., a second gesture input) on the user interface by the same method described in the operation S302, and the second gesture input includes a prefix for determining the search range. In this case, the first controller 160 may sense the shape of the second gesture input and determine the corresponding search range.

According to an exemplary embodiment, if the gesture input sensed in the operation S302 is a predetermined shape (e.g., a circle) with regard to a certain goods (e.g., a car) displayed on a broadcasting image, the gesture input may be determined as search for information about the corresponding goods in the operation S306. In this case, the first controller 160 controls the display 130 to display a result of searching for the corresponding goods in the operation S308.

As described above, according to an exemplary embodiment, the display system 1 employs single or combined gesture inputs of various methods for receiving a user's input, thereby providing more familiar and closer interaction with a user Further, the drawing object is displayed along the moving path of the gesture input, thereby giving feedback to a user and increasing user satisfaction.

Further, the single or combined gesture inputs are used to generate the search box of the certain search range and implement the search, so that a user can easily use the display apparatus 100 without reading a manual thoroughly.

Further, the input apparatus 200 is ergonomically designed for a user's hand and reflects a user's input including the gesture input to a screen intuitively, thereby improving interaction with a user through communion between a user and the input apparatus 200.

Further, the functions corresponding to the gesture inputs are provided to be set or modified by a user, so that a user can get various use experiences, thereby having an effect on utilizing his/her input by various personally optimized methods.

The above exemplary embodiments may be realized in a computer-readable recording medium. The computer-readable recording medium includes a transfer medium and a storage medium for storing data readable by a computer system. The transfer medium is materialized by a wired/wireless network to which the computer system is connected.

The above exemplary embodiments may be realized by hardware, software, and a combination between hardware and software. As the hardware, the first controller 160 may include a nonvolatile memory in which the software, i.e., a computer program is stored, a RAM to which the computer program stored in the nonvolatile memory is loaded, and at least one processor, i.e., a CPU for executing the computer program loaded to the RAM. The nonvolatile memory includes a hard disk drive, a flash memory, a ROM, CD-ROMs, magnetic tapes, a floppy disc, an optical storage, a data transfer apparatus using Internet, etc., but not limited thereto. The nonvolatile memory is a kind of computer-readable recording medium in which a program readable by a computer is recorded.

The computer program is a code that is read and executed by the CPU, and includes codes for performing the operations S302 to S308 of the first controller 160 shown in FIG. 24.

The computer program may be included in an operating system provided in the display apparatus 100 or software including an application and/or software interfacing with an external apparatus.

Although a few exemplary embodiments have been shown and described, it will be appreciated by those skilled in the art that changes may be made in exemplary embodiments without departing from the principles and spirit of the invention, the scope of which is defined in the appended claims and their equivalents.

What is claimed is:

1. A display apparatus comprising:
   a display, implemented by a display panel, configured to display an image;
   a communicator, implemented by a communication circuitry, configured to communicate with a remote controller, the remote controller comprising a motion sensor which senses a gesture input based on a movement of the remote controller; and
   a controller, implemented by at least one hardware processor, configured to:
   receive signals corresponding to gesture inputs being sensed by the motion sensor from the remote controller, the gesture inputs comprising a first gesture input drawing a figure having a predetermined shape and a second gesture input drawing a letter or a numeral in an area of the drawn figure,
   display a window having the predetermined shape of the drawn figure corresponding to a moving path of the sensed first gesture input and display the letter or the numeral in the window corresponding to a moving path of the sensed second gesture input on the display based on the received signals,
   based on the predetermined shape of the window, identify a command regarding the letter or the numeral from among a plurality of commands corresponding to a plurality of functions supported by the display apparatus, and
   perform a search operation depending on a keyword corresponding to the identified command and display search results on the display.

2. The display apparatus according to claim 1, wherein the controller is further configured to control the display to display a user interface corresponding to the window having the predetermined shape corresponding to the first gesture input, the second gesture input being input in response to the displayed window.

3. The display apparatus according to claim 2, wherein the user interface corresponds to a shape of a drawing object corresponding to the moving path of a pointer in accordance with the first gesture input.

4. The display apparatus according to claim 3, wherein the user interface comprises a search box for one among an internal search and an external search,
   the internal search searches for at least one among a function supported by the display apparatus, stored content, and a selectable channel, and
   the external search searches Internet or for a connectable external apparatus.

5. The display apparatus according to claim 4, wherein the controller is further configured to implement one among the internal search and the external search, based on at least one among a shape and color of the user interface, and a user's previous input.

6. The display apparatus according to claim 4, wherein the second gesture input comprises a prefix that is input to the search box, and
the controller is configured to implement the internal search or the external search in accordance with the input prefix, and control the display to display a search result.

7. The display apparatus according to claim 1, wherein the gesture input further comprises at least one among straight lines and curved lines having directivity.

8. The display apparatus according to claim 3, wherein the remote controller comprises a plurality of buttons, and
the controller is further configured to receive a user's previous input comprising a user's selection with regard to one among the plurality of buttons, identify a button selected by a user, and control the display to display the user interface corresponding to the identified button.

9. The display apparatus according to claim 1, further comprising a memory configured to store a table with the plurality of commands corresponding to a plurality of gesture inputs, and
the plurality of commands corresponding to the plurality of gesture inputs are set by a user.

10. A method of controlling a display apparatus, the method comprising:
receiving signals corresponding to gesture inputs from a remote controller, the remote controller comprising a motion sensor for sensing the gesture inputs comprising a first gesture input drawing a figure having a predetermined shape and a second gesture input drawing a letter or a numeral in an area of the drawn figure based on movements of the remote controller;
displaying a window having the predetermined shape of the drawn figure corresponding to a moving path of the sensed first gesture input and display the letter or the numeral in the window corresponding to a moving path of the sensed second gesture input on a display based on the received signals;
based on the predetermined shape of the window, identifying a command regarding the letter or the numeral from among a plurality of commands corresponding to a plurality of functions supported by the display apparatus; and
performing a search operation depending on a keyword corresponding to the identified command and displaying search results on the display.

11. The method according to claim 10, further comprising displaying a user interface corresponding to the window having the predetermined shape corresponding to the first gesture input, the second gesture input being input in response to the displayed window.

12. The method according to claim 11, wherein the user interface corresponds to a shape of a drawing object corresponding to the moving path of a pointer in accordance with the first gesture input.

13. The method according to claim 12, wherein the user interface comprises a search box for one among an internal search and an external search,
wherein the internal search searches for at least one among a function supported by the display apparatus, stored content, and a selectable channel, and the external search searches Internet or for a connectable external apparatus.

14. The method according to claim 13, further comprising performing one among the internal search and the external search, based on at least one among a shape and color of the user interface and a user's previous input.

15. The method according to claim 13, wherein the second gesture input comprises a prefix that is input to the search box, and
the method further comprising performing the internal search or the external search in accordance with the input prefix, and displaying a search result.

16. The method according to claim 10, wherein the gesture input further comprises at least one among straight lines and curved lines having directivity.

17. The method according to claim 12, wherein the remote controller comprises a plurality of buttons,
the method further comprises receiving a user's previous input comprising a user's selection with regard to one among the plurality of buttons, and
the displaying the user interface comprises determining a button selected by a user, and displaying the user interface corresponding to the determined button.

18. The method according to claim 10, further comprising setting or modifying the plurality of commands corresponding to a plurality of gesture inputs.

* * * * *